US012413183B2

(12) United States Patent
Clemente et al.

(10) Patent No.: US 12,413,183 B2
(45) Date of Patent: Sep. 9, 2025

(54) ELECTRICAL CABLE PASSTHROUGH FOR PHOTOVOLTAIC SYSTEMS

(71) Applicant: GAF Energy LLC, Parsippany, NJ (US)

(72) Inventors: Peter Clemente, Warren, NJ (US); Gary Rossi, San Francisco, CA (US); Evan Michael Wray, Cotati, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 18/509,636

(22) Filed: Nov. 15, 2023

(65) Prior Publication Data

US 2024/0162854 A1    May 16, 2024

Related U.S. Application Data

(60) Provisional application No. 63/383,844, filed on Nov. 15, 2022.

(51) Int. Cl.
*H02G 3/22* (2006.01)
*H02S 20/25* (2014.01)
*H02S 40/30* (2014.01)

(52) U.S. Cl.
CPC ............ *H02S 40/30* (2014.12); *H02G 3/22* (2013.01); *H02S 20/25* (2014.12)

(58) Field of Classification Search
CPC .. H02G 3/06–088; H02G 3/22; H05K 5/0247; H02S 20/25; H02S 40/30
See application file for complete search history.

(56) References Cited

U.S. PATENT DOCUMENTS

| | | | |
|---|---|---|---|
| 1,981,467 | A | 11/1934 | Radtke |
| 3,156,497 | A | 11/1964 | Lessard |
| 3,581,779 | A | 6/1971 | Gilbert, Jr. |
| 4,258,948 | A | 3/1981 | Hoffmann |
| 4,349,220 | A | 9/1982 | Carroll et al. |
| 4,499,702 | A | 2/1985 | Turner |
| 4,636,577 | A | 1/1987 | Peterpaul |

(Continued)

FOREIGN PATENT DOCUMENTS

| | | |
|---|---|---|
| CA | 2829440 A | 5/2019 |
| CH | 700095 A2 | 6/2010 |

(Continued)

OTHER PUBLICATIONS

Sunflare, Procducts: "Sunflare Develops Prototype For New Residential Solar Shingles"; 2019 <<sunflaresolar.com/news/sunflare-develops-prototype-for-new-residential-solar-shingles>> retrieved Feb. 2, 2021.

(Continued)

*Primary Examiner* — Roshn K Varghese
(74) *Attorney, Agent, or Firm* — GREENBERG TRAURIG, LLP

(57) ABSTRACT

A system comprises a passthrough installed on a roof deck. The passthrough includes a base with an aperture, and a lid attached to the base. The aperture of the base is configured to align with an aperture formed within the roof deck. The system includes at least one cable and a grommet installed on the at least one cable. The lid and the base are configured to compress the grommet around the at least one cable.

15 Claims, 9 Drawing Sheets

(56) References Cited

U.S. PATENT DOCUMENTS

| | | |
|---|---|---|
| 5,167,579 A | 12/1992 | Rotter |
| 5,437,735 A | 8/1995 | Younan et al. |
| 5,590,495 A | 1/1997 | Bressler et al. |
| 5,642,596 A | 7/1997 | Waddington |
| 6,008,450 A | 12/1999 | Ohtsuka et al. |
| 6,033,270 A | 3/2000 | Stuart |
| 6,046,399 A | 4/2000 | Kapner |
| 6,201,180 B1 | 3/2001 | Meyer et al. |
| 6,220,329 B1 | 4/2001 | King et al. |
| 6,308,482 B1 | 10/2001 | Strait |
| 6,320,114 B1 | 11/2001 | Kuechler |
| 6,320,115 B1 | 11/2001 | Kataoka et al. |
| 6,336,304 B1 | 1/2002 | Mimura et al. |
| 6,341,454 B1 | 1/2002 | Koleoglou |
| 6,407,329 B1 | 6/2002 | Iino et al. |
| 6,576,830 B2 | 6/2003 | Nagao et al. |
| 6,793,940 B2 | 9/2004 | Tournilhac et al. |
| 6,928,781 B2 | 8/2005 | Desbois et al. |
| 6,972,367 B2 | 12/2005 | Federspiel et al. |
| 7,138,578 B2 | 11/2006 | Komamine |
| 7,155,870 B2 | 1/2007 | Almy |
| 7,178,295 B2 | 2/2007 | Dinwoodie |
| 7,487,771 B1 | 2/2009 | Eifert et al. |
| 7,587,864 B2 | 9/2009 | McCaskill et al. |
| 7,678,990 B2 | 3/2010 | McCaskill et al. |
| 7,678,991 B2 | 3/2010 | McCaskill et al. |
| 7,748,191 B2 | 7/2010 | Podirsky |
| 7,819,114 B2 | 10/2010 | Augenbraun et al. |
| 7,824,191 B1 | 11/2010 | Podirsky |
| 7,832,176 B2 | 11/2010 | McCaskill et al. |
| 8,118,109 B1 | 2/2012 | Hacker |
| 8,168,880 B2 | 5/2012 | Jacobs et al. |
| 8,173,889 B2 | 5/2012 | Kalkanoglu et al. |
| 8,210,570 B1 | 7/2012 | Railkar et al. |
| 8,276,329 B2 | 10/2012 | Lenox |
| 8,312,693 B2 | 11/2012 | Cappelli |
| 8,319,093 B2 | 11/2012 | Kalkanoglu et al. |
| 8,333,040 B2 | 12/2012 | Shiao et al. |
| 8,371,076 B2 | 2/2013 | Jones et al. |
| 8,375,653 B2 | 2/2013 | Shiao et al. |
| 8,404,967 B2 | 3/2013 | Kalkanoglu et al. |
| 8,410,349 B2 | 4/2013 | Kalkanoglu et al. |
| 8,418,415 B2 | 4/2013 | Shiao et al. |
| 8,438,796 B2 | 5/2013 | Shiao et al. |
| 8,468,754 B2 | 6/2013 | Railkar et al. |
| 8,468,757 B2 | 6/2013 | Krause et al. |
| 8,505,249 B2 | 8/2013 | Geary |
| 8,512,866 B2 | 8/2013 | Taylor |
| 8,513,517 B2 | 8/2013 | Kalkanoglu et al. |
| 8,586,856 B2 | 11/2013 | Kalkanoglu et al. |
| 8,601,754 B2 | 12/2013 | Jenkins et al. |
| 8,629,578 B2 | 1/2014 | Kurs et al. |
| 8,646,228 B2 | 2/2014 | Jenkins |
| 8,656,657 B2 | 2/2014 | Livsey et al. |
| 8,671,630 B2 | 3/2014 | Lena et al. |
| 8,677,702 B2 | 3/2014 | Jenkins |
| 8,695,289 B2 | 4/2014 | Koch et al. |
| 8,713,858 B1 | 5/2014 | Xie |
| 8,713,860 B2 | 5/2014 | Railkar et al. |
| 8,733,038 B2 | 5/2014 | Kalkanoglu et al. |
| 8,776,455 B2 | 7/2014 | Azoulay |
| 8,789,321 B2 | 7/2014 | Ishida |
| 8,793,941 B2 | 8/2014 | Bosler et al. |
| 8,826,607 B2 | 9/2014 | Shiao et al. |
| 8,835,751 B2 | 9/2014 | Kalkanoglu et al. |
| 8,863,451 B2 | 10/2014 | Jenkins et al. |
| 8,898,970 B2 | 12/2014 | Jenkins et al. |
| 8,925,262 B2 | 1/2015 | Railkar et al. |
| 8,943,766 B2 | 2/2015 | Gombarick et al. |
| 8,946,544 B2 | 2/2015 | Jabos et al. |
| 8,950,128 B2 | 2/2015 | Kalkanoglu et al. |
| 8,959,848 B2 | 2/2015 | Jenkins et al. |
| 8,966,838 B2 | 3/2015 | Jenkins |
| 8,966,850 B2 | 3/2015 | Jenkins et al. |
| 8,994,224 B2 | 3/2015 | Mehta et al. |
| 9,032,672 B2 | 5/2015 | Livsey et al. |
| 9,153,950 B2 | 10/2015 | Yamanaka et al. |
| 9,166,087 B2 | 10/2015 | Chihlas et al. |
| 9,169,646 B2 | 10/2015 | Rodrigues et al. |
| 9,170,034 B2 | 10/2015 | Bosler et al. |
| 9,178,465 B2 | 11/2015 | Shiao et al. |
| 9,202,955 B2 | 12/2015 | Livsey et al. |
| 9,212,832 B2 | 12/2015 | Jenkins |
| 9,217,584 B2 | 12/2015 | Kalkanoglu et al. |
| 9,270,221 B2 | 2/2016 | Zhao |
| 9,273,885 B2 | 3/2016 | Rordigues et al. |
| 9,276,141 B2 | 3/2016 | Kalkanoglu et al. |
| 9,331,224 B2 | 5/2016 | Koch et al. |
| 9,356,174 B2 | 5/2016 | Duarte et al. |
| 9,359,014 B1 | 6/2016 | Yang et al. |
| 9,412,890 B1 | 8/2016 | Meyers |
| 9,528,270 B2 | 12/2016 | Jenkins et al. |
| 9,605,432 B1 | 3/2017 | Robbins |
| 9,711,672 B2 | 7/2017 | Wang |
| 9,755,573 B2 | 9/2017 | Livsey et al. |
| 9,786,802 B2 | 10/2017 | Shiao et al. |
| 9,831,818 B2 | 11/2017 | West |
| 9,912,284 B2 | 3/2018 | Svec |
| 9,923,515 B2 | 3/2018 | Rodrigues et al. |
| 9,938,729 B2 | 4/2018 | Coon |
| 9,991,412 B2 | 6/2018 | Gonzalez et al. |
| 9,998,067 B2 | 6/2018 | Kalkanoglu et al. |
| 10,027,273 B2 | 7/2018 | West et al. |
| 10,115,850 B2 | 10/2018 | Rodrigues et al. |
| 10,128,660 B1 | 11/2018 | Apte et al. |
| 10,156,075 B1 | 12/2018 | McDonough |
| 10,187,005 B2 | 1/2019 | Rodrigues et al. |
| 10,256,765 B2 | 4/2019 | Rodrigues et al. |
| 10,284,136 B1 | 5/2019 | Mayfield et al. |
| 10,454,408 B2 | 10/2019 | Livsey et al. |
| 10,530,292 B1 | 1/2020 | Cropper et al. |
| 10,560,048 B2 | 2/2020 | Fisher et al. |
| 10,563,406 B2 | 2/2020 | Kalkanoglu et al. |
| D879,031 S | 3/2020 | Lance et al. |
| 10,579,028 B1 | 3/2020 | Jacob |
| 10,784,813 B2 | 9/2020 | Kalkanoglu et al. |
| D904,289 S | 12/2020 | Lance et al. |
| 11,012,026 B2 | 5/2021 | Kalkanoglu et al. |
| 11,177,639 B1 | 11/2021 | Nguyen et al. |
| 11,217,715 B2 | 1/2022 | Sharenko |
| 11,251,744 B1 | 2/2022 | Bunea |
| 11,258,399 B2 | 2/2022 | Kalkanoglu et al. |
| 11,283,394 B2 | 3/2022 | Perkins et al. |
| 11,309,828 B2 | 4/2022 | Sirski et al. |
| 11,394,344 B2 | 7/2022 | Perkins et al. |
| 11,424,379 B2 | 8/2022 | Sharenko et al. |
| 11,431,280 B2 | 8/2022 | Liu et al. |
| 11,431,281 B2 | 8/2022 | Perkins et al. |
| 11,444,569 B2 | 9/2022 | Clemente et al. |
| 11,454,027 B2 | 9/2022 | Kuiper et al. |
| 11,459,757 B2 | 10/2022 | Nguyen et al. |
| 11,486,144 B2 | 11/2022 | Bunea et al. |
| 11,489,482 B2 | 11/2022 | Peterson et al. |
| 11,496,088 B2 | 11/2022 | Sirski et al. |
| 11,508,861 B1 | 11/2022 | Perkins et al. |
| 11,512,480 B1 | 11/2022 | Achor et al. |
| 11,527,665 B2 | 12/2022 | Boitnott |
| 11,545,927 B2 | 1/2023 | Abra et al. |
| 11,545,928 B2 | 1/2023 | Perkins et al. |
| 11,658,470 B2 | 5/2023 | Nguyen et al. |
| 11,661,745 B2 | 5/2023 | Bunea et al. |
| 11,689,149 B2 | 6/2023 | Clemente et al. |
| 11,705,531 B2 | 7/2023 | Sharenko et al. |
| 11,728,759 B2 | 8/2023 | Nguyen et al. |
| 11,732,490 B2 | 8/2023 | Achor et al. |
| 11,811,361 B1 | 11/2023 | Farhangi et al. |
| 11,824,486 B2 | 11/2023 | Nguyen et al. |
| 11,824,487 B2 | 11/2023 | Nguyen et al. |
| 11,843,067 B2 | 12/2023 | Nguyen et al. |
| 2002/0053360 A1 | 5/2002 | Kinoshita et al. |
| 2002/0129849 A1 | 9/2002 | Heckeroth |
| 2003/0101662 A1 | 6/2003 | Ullman |
| 2003/0132265 A1 | 7/2003 | Villela et al. |
| 2003/0217768 A1 | 11/2003 | Guha |

(56) References Cited

U.S. PATENT DOCUMENTS

| | | |
|---|---|---|
| 2004/0000334 A1 | 1/2004 | Ressler |
| 2005/0030187 A1 | 2/2005 | Peress et al. |
| 2005/0115603 A1 | 6/2005 | Yoshida et al. |
| 2005/0144670 A1 | 6/2005 | Fujiyama et al. |
| 2005/0178428 A1 | 8/2005 | Laaly et al. |
| 2005/0193673 A1 | 9/2005 | Rodrigues et al. |
| 2006/0042683 A1 | 3/2006 | Gangemi |
| 2006/0046084 A1 | 3/2006 | Yang et al. |
| 2007/0007038 A1* | 1/2007 | Cox .................. H02G 15/013 174/650 |
| 2007/0074757 A1 | 4/2007 | Mellott et al. |
| 2007/0181174 A1 | 8/2007 | Ressler |
| 2007/0193618 A1 | 8/2007 | Bressler et al. |
| 2007/0216110 A1* | 9/2007 | Stuckmann .............. H02G 3/22 277/607 |
| 2007/0249194 A1 | 10/2007 | Liao |
| 2007/0295385 A1 | 12/2007 | Sheats et al. |
| 2008/0006323 A1 | 1/2008 | Kalkanoglu et al. |
| 2008/0035140 A1 | 2/2008 | Placer et al. |
| 2008/0078440 A1 | 4/2008 | Lim et al. |
| 2008/0185748 A1 | 8/2008 | Kalkanoglu |
| 2008/0271774 A1 | 11/2008 | Kalkanoglu et al. |
| 2008/0302030 A1 | 12/2008 | Stancel et al. |
| 2008/0315061 A1 | 12/2008 | Fath |
| 2009/0000222 A1 | 1/2009 | Kalkanoglu et al. |
| 2009/0014057 A1 | 1/2009 | Croft et al. |
| 2009/0014058 A1 | 1/2009 | Croft et al. |
| 2009/0019795 A1 | 1/2009 | Szacsvay et al. |
| 2009/0044850 A1 | 2/2009 | Kimberley |
| 2009/0114261 A1 | 5/2009 | Stancel et al. |
| 2009/0133340 A1 | 5/2009 | Shiao et al. |
| 2009/0159118 A1 | 6/2009 | Kalkanoglu et al. |
| 2009/0178350 A1 | 7/2009 | Kalkanoglu et al. |
| 2009/0229652 A1 | 9/2009 | Mapel et al. |
| 2009/0275247 A1 | 11/2009 | Richter et al. |
| 2010/0019580 A1 | 1/2010 | Croft et al. |
| 2010/0095618 A1 | 4/2010 | Edison et al. |
| 2010/0101634 A1 | 4/2010 | Frank et al. |
| 2010/0116325 A1 | 5/2010 | Nikoonahad |
| 2010/0131108 A1 | 5/2010 | Meyer |
| 2010/0139184 A1 | 6/2010 | Williams et al. |
| 2010/0146878 A1 | 6/2010 | Koch et al. |
| 2010/0159221 A1 | 6/2010 | Kourtakis et al. |
| 2010/0170169 A1 | 7/2010 | Railkar et al. |
| 2010/0186798 A1 | 7/2010 | Tormen et al. |
| 2010/0242381 A1 | 9/2010 | Jenkins |
| 2010/0313499 A1 | 12/2010 | Gangemi |
| 2010/0325976 A1 | 12/2010 | DeGenfelder et al. |
| 2010/0326488 A1 | 12/2010 | Aue et al. |
| 2010/0326501 A1 | 12/2010 | Zhao et al. |
| 2011/0030761 A1 | 2/2011 | Kalkanoglu et al. |
| 2011/0036386 A1 | 2/2011 | Browder |
| 2011/0036389 A1 | 2/2011 | Hardikar et al. |
| 2011/0048507 A1 | 3/2011 | Livsey et al. |
| 2011/0058337 A1 | 3/2011 | Han et al. |
| 2011/0061326 A1 | 3/2011 | Jenkins |
| 2011/0100436 A1 | 5/2011 | Cleereman et al. |
| 2011/0104488 A1 | 5/2011 | Muessig et al. |
| 2011/0132427 A1 | 6/2011 | Kalkanoglu et al. |
| 2011/0168238 A1 | 7/2011 | Metin et al. |
| 2011/0239555 A1 | 10/2011 | Cook et al. |
| 2011/0302859 A1 | 12/2011 | Crasnianski |
| 2011/0314753 A1 | 12/2011 | Farmer et al. |
| 2012/0034799 A1 | 2/2012 | Hunt |
| 2012/0060434 A1 | 3/2012 | Jacobs |
| 2012/0060902 A1 | 3/2012 | Drake |
| 2012/0085392 A1 | 4/2012 | Albert et al. |
| 2012/0137600 A1 | 6/2012 | Jenkins |
| 2012/0176077 A1 | 7/2012 | Oh et al. |
| 2012/0212065 A1 | 8/2012 | Cheng et al. |
| 2012/0233940 A1 | 9/2012 | Perkins et al. |
| 2012/0240490 A1 | 9/2012 | Gangemi |
| 2012/0260977 A1 | 10/2012 | Stancel |
| 2012/0266942 A1 | 10/2012 | Komatsu et al. |
| 2012/0279150 A1 | 11/2012 | Pisikak et al. |
| 2012/0282437 A1 | 11/2012 | Clark et al. |
| 2012/0291848 A1 | 11/2012 | Sherman et al. |
| 2013/0008499 A1 | 1/2013 | Verger et al. |
| 2013/0014455 A1 | 1/2013 | Grieco |
| 2013/0118558 A1 | 5/2013 | Sherman |
| 2013/0193769 A1 | 8/2013 | Mehta et al. |
| 2013/0247988 A1 | 9/2013 | Reese et al. |
| 2013/0284267 A1 | 10/2013 | Plug et al. |
| 2013/0306137 A1 | 11/2013 | Ko |
| 2014/0090697 A1 | 4/2014 | Rodrigues et al. |
| 2014/0150843 A1 | 6/2014 | Pearce et al. |
| 2014/0173997 A1 | 6/2014 | Jenkins |
| 2014/0179220 A1 | 6/2014 | Railkar et al. |
| 2014/0182222 A1 | 7/2014 | Kalkanoglu et al. |
| 2014/0208675 A1 | 7/2014 | Beerer et al. |
| 2014/0254776 A1 | 9/2014 | O'Connor et al. |
| 2014/0266289 A1 | 9/2014 | Della Sera et al. |
| 2014/0284098 A1 | 9/2014 | Yamanaka et al. |
| 2014/0311556 A1 | 10/2014 | Feng et al. |
| 2014/0352760 A1 | 12/2014 | Haynes et al. |
| 2014/0366464 A1 | 12/2014 | Rodrigues et al. |
| 2015/0089895 A1 | 4/2015 | Leitch |
| 2015/0162459 A1 | 6/2015 | Lu et al. |
| 2015/0340516 A1 | 11/2015 | Kim et al. |
| 2015/0349173 A1 | 12/2015 | Morad et al. |
| 2016/0105144 A1 | 4/2016 | Haynes et al. |
| 2016/0142008 A1 | 5/2016 | Lopez et al. |
| 2016/0254776 A1 | 9/2016 | Rodrigues et al. |
| 2016/0276508 A1 | 9/2016 | Huang et al. |
| 2016/0359451 A1 | 12/2016 | Mao et al. |
| 2017/0159292 A1 | 6/2017 | Chihlas et al. |
| 2017/0179319 A1 | 6/2017 | Yamashita et al. |
| 2017/0179726 A1 | 6/2017 | Garrity et al. |
| 2017/0237390 A1 | 8/2017 | Hudson et al. |
| 2017/0331415 A1 | 11/2017 | Koppi et al. |
| 2018/0094438 A1 | 4/2018 | Wu et al. |
| 2018/0097472 A1 | 4/2018 | Anderson et al. |
| 2018/0115275 A1 | 4/2018 | Flanigan et al. |
| 2018/0254738 A1 | 9/2018 | Yang et al. |
| 2018/0294765 A1 | 10/2018 | Friedrich et al. |
| 2018/0351502 A1 | 12/2018 | Almy et al. |
| 2018/0367089 A1 | 12/2018 | Stutterheim et al. |
| 2019/0030867 A1 | 1/2019 | Sun et al. |
| 2019/0081436 A1 | 3/2019 | Onodi et al. |
| 2019/0123679 A1 | 4/2019 | Rodrigues et al. |
| 2019/0253022 A1 | 8/2019 | Hardar et al. |
| 2019/0305717 A1 | 10/2019 | Allen et al. |
| 2020/0109320 A1 | 4/2020 | Jiang |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1 | 10/2020 | Hem-Jensen |
| 2021/0083619 A1 | 3/2021 | Hegedus |
| 2021/0115223 A1 | 4/2021 | Bonekamp et al. |
| 2021/0159353 A1 | 5/2021 | Li et al. |
| 2021/0301536 A1 | 9/2021 | Baggs et al. |
| 2021/0343886 A1 | 11/2021 | Sharenko et al. |
| 2022/0149213 A1 | 5/2022 | Mensink et al. |

FOREIGN PATENT DOCUMENTS

| | | |
|---|---|---|
| CN | 202797032 U | 3/2013 |
| CN | 217150978 U | 8/2022 |
| DE | 1958248 A1 | 11/1971 |
| EP | 1039361 A1 | 9/2000 |
| EP | 1837162 A1 | 9/2007 |
| EP | 1774372 A1 | 7/2011 |
| EP | 2446481 A2 | 5/2012 |
| EP | 2784241 A1 | 10/2014 |
| EP | 3772175 A1 | 2/2021 |
| JP | H02243866 A | 9/1990 |
| JP | 10046767 A | 2/1998 |
| JP | 2001-248276 A | 9/2001 |
| JP | 2002-106151 A | 4/2002 |
| JP | 2001-098703 A | 10/2002 |
| JP | 2008-266977 A | 11/2008 |
| JP | 2014-233153 A | 12/2014 |
| JP | 2015-040457 A | 3/2015 |
| JP | 2017-027735 A | 2/2017 |

(56) References Cited

FOREIGN PATENT DOCUMENTS

| | | |
|---|---|---|
| JP | 2018053707 A | 4/2018 |
| KR | 20090084060 A | 8/2009 |
| KR | 10-1348283 B1 | 1/2014 |
| KR | 10-2019-0000367 A | 1/2019 |
| KR | 10-2253483 B1 | 5/2021 |
| NL | 2026856 B1 | 6/2022 |
| WO | 2010/151777 A2 | 12/2010 |
| WO | 2011/049944 A1 | 4/2011 |
| WO | 2015/133632 A1 | 9/2015 |
| WO | 2018/000589 A1 | 1/2018 |
| WO | 2019/201416 A1 | 10/2019 |
| WO | 2020-159358 A1 | 8/2020 |
| WO | 2021-247098 A1 | 12/2021 |

OTHER PUBLICATIONS

RGS Energy, 3.5kW Powerhouse 3.0 system installed in an afternoon; Jun. 7, 2019 <<facebook.com/RGSEnergy/>> retrieved Feb. 2, 2021.
Tesla, Solar Roof <<tesla.com/solarroof>> retrieved Feb. 2, 2021.
"Types of Roofing Underlayment", Owens Corning Roofing; <<https://www.owenscorning.com/en-us/roofing/tools/how-roofing-underlayment-helps-protect-your-home>> retrieved Nov. 1, 2021.

\* cited by examiner

ELECTRICAL CABLE PASSTHROUGH FOR PHOTOVOLTAIC SYSTEMS

CROSS-REFERENCE TO RELATED APPLICATION

This application is a Section 111(a) application relating to and claiming the benefit of commonly-owned, U.S. Provisional Patent Application Ser. No. 63/383,844, filed Nov. 15, 2022, entitled "ELECTRICAL CABLE PASSTHROUGH FOR PHOTOVOLTAIC SYSTEMS," the contents of which is incorporated herein by reference in its entirety.

FIELD OF THE INVENTION

The present invention relates to passthrough devices and, more particularly, passthrough devices for electrical cables for photovoltaic systems.

BACKGROUND OF THE INVENTION

Photovoltaic systems having solar modules are commonly installed on roofing of structures.

SUMMARY

In some embodiments, a system includes a roof deck; a passthrough installed on the roof deck, wherein the passthrough includes a base having a first end and a second end opposite the first end, a first surface extending from the first end to the second end, a second surface opposite the first surface, and an aperture extending from the first surface to the second surface, a lid attached to the base, wherein the lid includes a first end substantially aligned with the first end of the base, and a sidewall between the base and the lid, wherein the first surface is juxtaposed with the roof deck, and wherein the aperture of the base of the passthrough is configured to align with an aperture formed within the roof deck; at least one cable, wherein the at least one cable includes a first end and a second end opposite the first end of the at least one cable; and a grommet installed on the at least one cable proximate to the first end of the at least one cable, wherein the lid and the base are configured to compress the grommet around the at least one cable when the lid is attached to the base, wherein the aperture of the base of the passthrough is sized and shaped to receive the at least one cable, and wherein the first end of the at least one cable extends outwardly from the first end of base and the first end of the lid of the passthrough.

In some embodiments, the lid is removably attached to the base. In some embodiments, the system includes a photovoltaic module installed on the roof deck, wherein the passthrough is installed proximate to the photovoltaic module. In some embodiments, the sidewall includes at least one aperture, wherein the at least one aperture of the sidewall is sized and shaped to receive a corresponding one of the at least one cable. In some embodiments, the grommet includes at least one opening sized and shaped to receive a corresponding one of the at least one cable. In some embodiments, the sidewall includes a first end, wherein the first end of the sidewall is proximate to the first end of the base, and wherein the at least one aperture of the sidewall is located at the first end of the sidewall. In some embodiments, the base includes at least one first cavity, wherein the lid includes at least one second cavity, and wherein the at least one first cavity and the at least one second cavity are sized and shaped to form a corresponding one of the at least one aperture. In some embodiments, the grommet is located between the at least one first cavity and the at least one second cavity.

In some embodiments, the grommet is configured to be compressed between the at least one first cavity and the at least one second cavity. In some embodiments, the at least one first cavity includes a plurality of first cavities, wherein the at least one second cavity includes a plurality of second cavities, and wherein the at least one aperture of the sidewall includes a plurality of apertures, wherein the at least one cable includes a plurality of cables. In some embodiments, the at least one opening of the grommet includes a plurality of openings, and wherein each of the plurality of openings is sized and shaped to receive a corresponding one of the plurality of cables. In some embodiments, the grommet includes a plurality of sections, wherein each of the plurality of openings is located in a corresponding one of the plurality of sections, and wherein each of the plurality of sections of the grommet is located between a corresponding one of the plurality of first cavities and a corresponding one of the plurality of second cavities. In some embodiments, the at least one cable includes an electrical connector, wherein the at least one aperture of the sidewall is sized and shaped to receive the electrical connector of the at least one cable. In some embodiments, the base of the passthrough includes a tubular member extending from the first surface, wherein the tubular member includes the aperture of the base, and wherein the aperture of the roof deck is sized and shaped to receive the tubular member.

In some embodiments, the system further includes a receiver attached to the tubular member. In some embodiments, the system further includes an electrical box installed underneath the roof deck, and wherein the electrical box directly receives the tubular member.

In some embodiments, a cable passthrough includes a base having a first end and a second end opposite the first end, a first surface extending from the first end to the second end, a second surface opposite the first surface, and an aperture extending from the first surface to the second surface; a lid attached to the base, wherein the lid includes a first end substantially aligned with the first end of the base; and a sidewall between the base and the lid, wherein the cable passthrough is configured to be installed on a roof deck such that the first surface is juxtaposed with the roof deck, and wherein the aperture of the base is configured to align with an aperture formed within the roof deck, wherein the cable passthrough is configured to receive at least one cable, wherein the aperture of the base is sized and shaped to receive the at least one cable, wherein the at least one cable is capable of extending outwardly from the first end of the base and the first end of the lid of the cable passthrough, and wherein the lid and the base are configured to compress a grommet installed around the at least one cable when the lid is attached to the base.

In some embodiments, a system includes a roof deck; a passthrough installed on the roof deck, wherein the passthrough includes a base having a first end and a second end opposite the first end, a first surface extending from the first end to the second end, a second surface opposite the first surface, and an aperture extending from the first surface to the second surface, a lid attached to the base, and a sidewall between the base and the lid; a photovoltaic module installed on the roof deck, wherein the photovoltaic module includes a first side lap, wherein the first side lap includes an aperture; a roofing shingle installed on the roof deck, wherein the roofing shingle includes a first side lap, wherein the first side lap of the roofing shingle includes an aperture, wherein the first side lap of the roofing shingle overlays the first side lap of the photovoltaic module, wherein the aperture of the roofing shingle, the aperture of the photovoltaic module, and an aperture formed within the roof deck are aligned, and wherein the aperture of the base of the passthrough is aligned with the aperture of the roof deck, the aperture of the roofing shingle, and the aperture of the photovoltaic module; and at least one cable, wherein the at least one cable includes a first end and a second end opposite the first end of the at least one cable, and wherein the aperture of the base of the passthrough, the aperture of the roofing shingle, and the aperture of the photovoltaic module, are sized and shaped to receive the at least one cable, and wherein the first end of the at least one cable extends outwardly from the first end of base and the first end of the lid of the passthrough.

In some embodiments, the system includes a first flashing member, wherein the first flashing member is between the passthrough and the first side lap of the roofing shingle. In some embodiments, the system includes a second flashing member, wherein the second flashing member is between the first side lap of the roofing shingle and the first side lap of the photovoltaic module.

DETAILED DESCRIPTION

Figure 1:
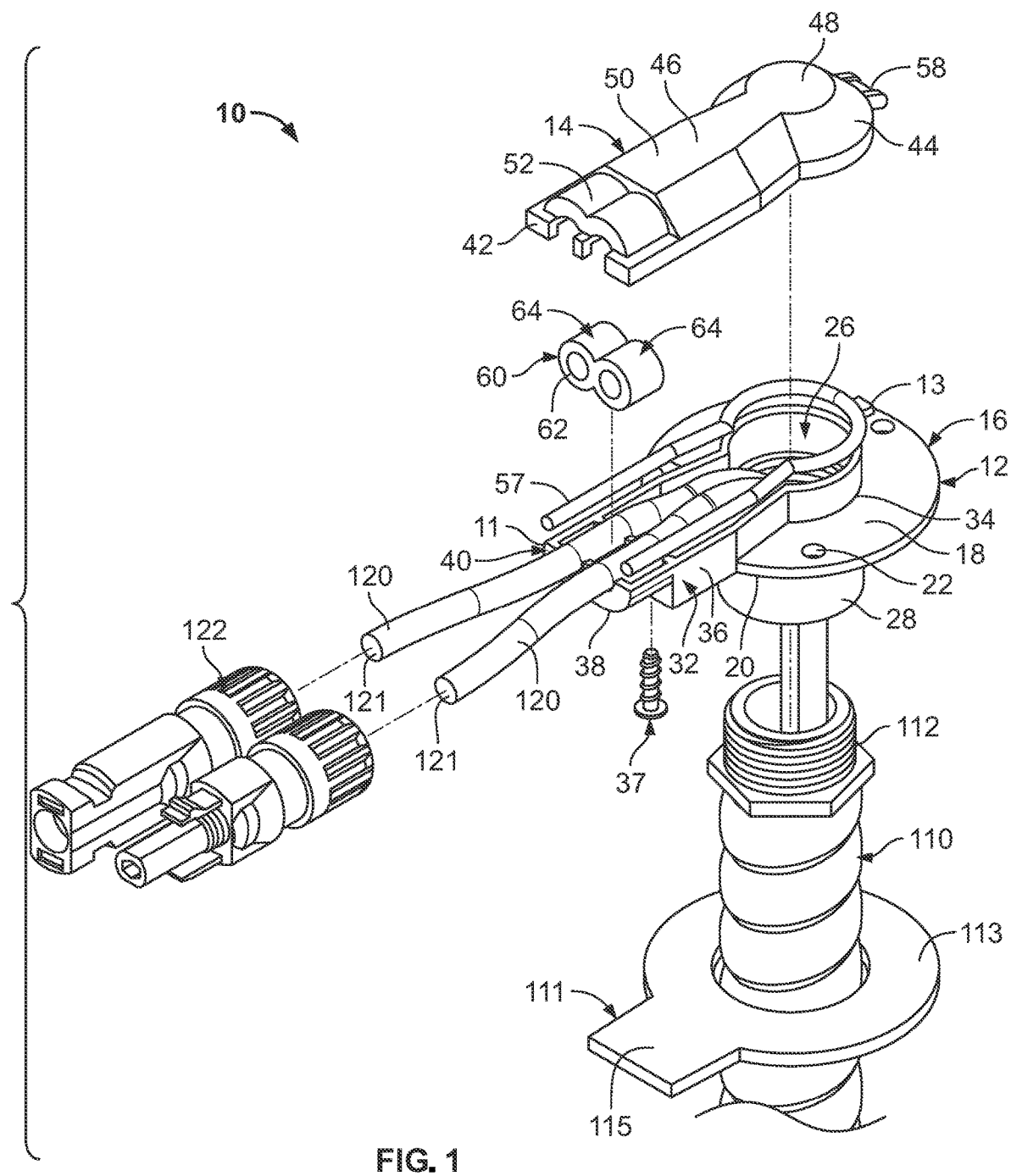
FIGS. 1 and 2 illustrate some embodiments of an electrical cable passthrough.
Figure 2:
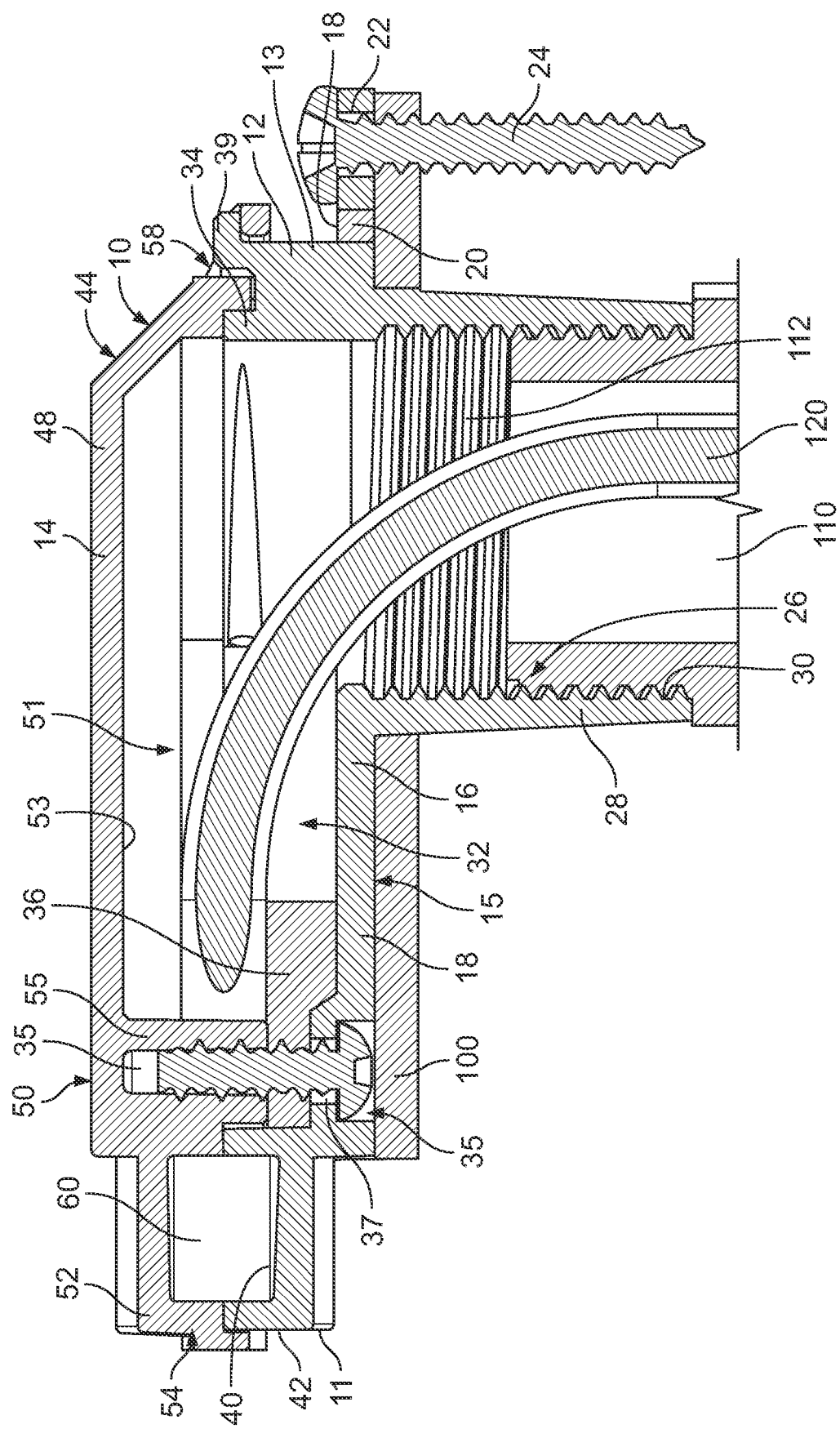

Referring to FIGS. 1 and 2, in some embodiments, an electrical cable passthrough 10 (hereinafter "passthrough 10") is configured to be installed on a roof deck 100 of a structure. In some embodiments, the passthrough 10 is a component of a photovoltaic system. In some embodiments, the passthrough 10 includes a base 12 and a lid 14. In some embodiments, the lid 14 is configured to be attached to the base 12. In some embodiments, the lid 14 is configured to be removably attached to the base 12.

In some embodiments, the base 12 includes a first end 11 and a second end 13 opposite the first end 11. In some embodiments, the base 12 incudes a base plate 16. In some embodiments, the base plate 16 includes a first surface 18 and a second surface 20 opposite the first surface 18. In some embodiments, the first surface 18 extends from the first end 11 to the second end 13. In some embodiments, the second surface 20 extends from the first end 11 to the second end 13. In some embodiments, the base plate 16 has a circular shape. In some embodiments, the base plate 16 is substantially circular in shape. In some embodiments, the base plate 16 has a square shape. In some embodiments, the base plate 16 has a rectangular shape. In some embodiments, the base plate 16 has a triangular shape. In some embodiments, the base plate 16 has an elliptical shape. In some embodiments, the base plate 16 has a polygonal shape. In some embodiments, the base plate 16 has at least one aperture 22 extending from the first surface 18 to the second surface 20. In some embodiments, the at least one aperture 22 includes a plurality of apertures 22. In some embodiments, each of the apertures 22 is sized and shaped to receive a fastener 24. In some embodiments, the fastener 24 is a screw. In some embodiments, the fastener 24 is a bolt. In some embodiments, the fastener 24 is a nail. In some embodiments, the fasteners 24 are configured to mount and secure the passthrough 10 on the roof deck 100. In some embodiments, the base plate 16 is configured to be positioned substantially flush with the roof deck 100. In some embodiments, the base plate 16 is configured to be positioned flush with the roof deck 100.

In some embodiments, an aperture 26 extends from the first surface 18 to the second surface 20. In some embodiments, the aperture 26 is circular in shape. In some embodiments, the aperture 26 is square in shape. In some embodiments, the aperture 26 is rectangular in shape. In some embodiments, the aperture 26 is polygonal in shape. In some embodiments, the base 12 includes a tubular portion 28 extending from the second surface 20. In some embodiments, the aperture 26 extends from the first surface 18 to the tubular portion 28. In some embodiments, the tubular portion 28 includes internal threads 30. In some embodiments, the tubular portion 28 is sized and shaped to receive a conduit 110. In some embodiments, external threads 112 of the conduit 110 threadedly engage the internal threads 30 of the tubular portion 28. In some embodiments, the tubular portion 28 includes external threads and the conduit 110 includes internal threads that threadedly engage with the external threads of the tubular portion. In some embodiments, the conduit 110 is attached to the tubular portion 28 by a fastener. In some embodiments, the conduit 110 is attached to the tubular portion 28 by an adhesive. In some embodiments, the conduit 110 is attached to the tubular portion 28 by welding. In some embodiments, a seal 111 is located below the base 12. In some embodiments, the seal 111 includes a first portion 113. In some embodiments, the first portion 113 is located below the base 12. In some embodiments, the first portion 113 is sized and shaped to match or substantially match the size and shape of the lower surface 15 of the base 12. In some embodiments, the seal 111 includes a second portion 115. In some embodiments, the second portion 115 extends from the first portion 113. In some embodiments, the second portion 115 is located below the sidewall 32. In some embodiments, the second portion 115 is sized and shaped to match or substantially match the size and shape of the lower surface of the sidewall 32. In some embodiments, the seal 111 is composed of butyl, silicone, rubber, epoxy, latex, neoprene, or polyurethane foam.

In some embodiments, the base 12 includes a sidewall 32. In some embodiments, the sidewall 32 extends outwardly from the base plate 16. In some embodiments, the sidewall 32 extends outwardly from the first surface 18 of the base plate 16. In some embodiments, the sidewall 32 includes a first portion 34. In some embodiments, the first portion 34 circumferentially surrounds the aperture 26 at the first surface 18. In some embodiments, the first portion 34 is substantially circular in shape. In some embodiments, the sidewall 32 includes a second portion 36. In some embodiments, the second portion 36 is adjacent the first portion 34. In some embodiments, the second portion 36 extends from the first portion 34 to the first end 11. In some embodiments, the second portion 36 is oblong in shape. In some embodiments, the second portion 36 is substantially rectangular in shape. In some embodiments, the first portion 34 and the second portion 36 form a keyhole shape.

In some embodiments, the second portion 36 includes a bore 35. In some embodiments, the bore 35 includes an internal thread. In some embodiments, the bore 35 is configured to receive a fastener 37. As discussed below, in some embodiments, the fastener 37 is configured to fasten the lid 14 to the base 12. In some embodiment, the second portion 36 includes at least one tab 39 extending outwardly proximate the second end 13. In some embodiments, the at least one tab 39 includes a plurality of tabs 39. As discussed below, in some embodiments, the at least one tab 39 is sized and shaped to engage a slot 58 of the lid 14.

In some embodiments, the sidewall 32 includes a first end 38. In some embodiments, the first end 38 of the sidewall 32 is proximate to the first end 11 of the base 12. In some embodiments, at least one first cavity 40 is located at the first end 38 of the sidewall 32. In some embodiments, the at least one first cavity 40 includes one first cavity 40. In some embodiments, the at least one first cavity 40 includes a plurality of first cavities 40. In some embodiments, the plurality of first cavities 40 includes two of the first cavities 40. In some embodiments, the plurality of first cavities 40 includes three of the first cavities 40. In some embodiments, the plurality of first cavities 40 includes four of the first cavities 40. In some embodiments, the plurality of first cavities 40 includes more than four of the cavities 40. In some embodiments, each of the first cavities 40 is semi-tubular or semi-cylindrical in shape.

In some embodiments, the lid 14 includes a first end 42 and a second end 44 opposite the first end 42. In some embodiments, the lid 14 includes an outer wall 46. In some embodiments, the outer wall 46 includes a first portion 48. In some embodiments, the first portion 48 is substantially circular in shape. In some embodiments, the outer wall 46 includes a second portion 50. In some embodiments, the second portion 50 is adjacent the first portion 48. In some embodiments, the second portion 50 extends from the first portion 48 to the first end 42. In some embodiments, the second portion 50 is oblong in shape. In some embodiments, the second portion 50 is substantially rectangular in shape. In some embodiments, the first portion 48 and the second portion 50 form a keyhole shape. In some embodiments, the lid 14 is attached to the sidewall 32 of the base 12. In some embodiments, the lid 14 has a size and shape that is substantially similar to the size and shape of the sidewall 32 of the base 12. In some embodiments, the first portion 48 of the lid 14 covers the first portion 34 of the sidewall 32 of the base 12. In some embodiments, the second portion 50 of the lid 14 covers the second portion 36 of the sidewall 32 of the base 12. In some embodiments, the first end 42 of the lid 14 is substantially aligned with the first end 11 of the base 12. In some embodiments, the first end 42 of the lid 14 is aligned with the first end 11 of the base 12. In some embodiments, the lid 14 is hollow and with the base 12 forms an interior portion 51. In some embodiments, the interior portion 51 is sized and shaped to receive at least one electrical cable 120. In some embodiments, the passthrough includes a O-ring 57. In some embodiments, the O-ring 57 is between the base 12 and the lid 14. In some embodiments, the O-ring 57 is between the sidewall 32 of the base 12 and the outer wall 46 of the lid. In some embodiments, the O-ring 57 forms a watertight seal between the base 12 and the lid 14. In some embodiments, the O-ring 57 is made from rubber. In some embodiments, the O-ring 57 is made from styrene-butadiene or styrene-butadiene rubber (SBR). In some embodiments, the O-ring 57 is made from nitrile butadiene rubber (NBR).

In some embodiments, the O-ring 57 is made from EPDM rubber (ethylene propylene diene monomer rubber). In some embodiments, the O-ring 57 is made from plastic. In some embodiments, the O-ring 57 is made from a polymer. In some embodiments, the O-ring 57 is made from silicone. In some embodiments, the O-ring 57 is made from polytetrafluoroethylene (PTFE). In some embodiments, the O-ring 57 is made from fluorosilicone (FVMQ). In some embodiments, the O-ring 57 is made from polyurethane.

In some embodiments, the lid 14 includes an inner wall 53 and a receptacle 55 extending from the inner wall 53. In some embodiments, the receptacle 55 includes an internal thread. In some embodiments, the bore 35 and the receptacle 55 are configured to receive the fastener 37 to fasten the lid 14 to the base 12. In some embodiments, the fastener 37 is a screw. In some embodiments, the fastener 37 is a compression screw. In some embodiments, the fastener 37 is bolt. In some embodiments, the fastener 37 is a threaded rod.

In some embodiments, at least one second cavity 52 is located at the first end 42 of the lid 14. In some embodiments, the at least one second cavity 52 includes a single cavity 52. In some embodiments, the at least one second cavity 52 includes a plurality of second cavities 52. In some embodiments, the plurality of second cavities 52 includes two of the second cavities 52. In some embodiments, the plurality of second cavities 52 includes three of the second cavities 52. In some embodiments, the plurality of second cavities 52 includes four of the second cavities 52. In some embodiments, the plurality of second cavities 52 includes more than four of the second cavities 52. In some embodiments, each of the second cavities 52 is semi-tubular or semi-cylindrical in shape.

In some embodiments, at least one aperture 54 is located at the first end 38 of the sidewall 32. In some embodiments, the at least one aperture 54 of the sidewall 32 is sized and shaped to receive a corresponding one of the at least one electrical cable 120. In some embodiments, the at least one first cavity 40 of the base 12 and the at least one second cavity 52 of the lid 14 are sized and shaped to form a corresponding one of the at least one aperture 54. In some embodiments, the at least one aperture 54 includes a plurality of apertures 54. In some embodiments, the plurality of first cavities 40 of the base 12 and the plurality of second cavities 52 of the lid 14 are sized and shaped to form a corresponding one of the a plurality of the apertures 54. In some embodiments, each of the plurality of the apertures 54 is sized and shaped to receive a corresponding one of the a plurality of the electrical cables 120. In some embodiments, the plurality of the apertures 54 includes two of the apertures 54. In some embodiments, the plurality of the electrical cables 120 includes two of the electrical cables 120. In some embodiments, the plurality of the apertures 54 includes three of the apertures 54. In some embodiments, the plurality of the electrical cables 120 includes three of the electrical cables 120. In some embodiments, the plurality of the apertures 54 includes four of the apertures 54. In some embodiments, the plurality of the electrical cables 120 includes four of the electrical cables 120. In some embodiments, the plurality of the apertures 54 includes more than four of the apertures 54. In some embodiments, the plurality of the electrical cables 120 includes more than four of the electrical cables 120. In some embodiments, the at least one aperture 54 is circular in shape. In some embodiments, the at least one aperture 54 is square in shape.

In some embodiments, the lid 14 includes at least one slot 58 at the second end 44 thereof that is sized and shaped to receive a corresponding one of the at least one tab 39 of the base 12. In some embodiments, the at least one slot 58 includes a plurality of slots 58. In some embodiments, the at least one tab 39 includes a plurality of tabs 39. In some embodiments, each of the tabs 39 is sized and shaped to engage a corresponding one of the slots 58 to removably secure the lid 14 to the base 12.

In some embodiments, one or both of the base 12 and the lid 14 are made from plastic. In some embodiments, the base 12 and the lid 14 are made from polypropylene. In some embodiments, the base 12 and the lid 14 are made from a polymer blend with polypropylene as a base resin. In another embodiment, the base 12 and the lid 14 are made from thermoplastic polyolefin (TPO). In another embodiment, the TPO is a modified TPO including fiberglass and/or other filler material. In another embodiment, the base 12 and the lid 14 are made from metal. In some embodiments, the base 12 and the lid 14 are made of aluminum. In another embodiment, the base 12 and the lid 14 are made of stainless steel.

In some embodiments, the at least one electrical cable 120 includes the at least one electrical connector 122. In some embodiments, the at least one electrical connector 122 is a bulkhead (i.e., panel mount) connector. In some embodiments, the at least one electrical connector 122 is electrically connected to jumper modules, jumper cables, junction boxes, or module leads.

In some embodiments, a grommet 60 is installed on the at least one electrical cable 120. In some embodiments, a grommet 60 is installed proximate to a first end 121 of the at least one electrical cable 120. In some embodiments, the grommet 60 includes at least one opening 62. In some embodiments, the at least one opening 62 is sized and shaped to receive a corresponding one of the at least one electrical cable 120. In some embodiments, the grommet 60 is installed and located between the at least one first cavity 40 of the base 12 and the at least one second cavity 52 of the lid 14. In some embodiments, the grommet 60 is configured to be compressed between the at least one first cavity 40 of the base 12 and the at least one second cavity 52 of the lid 14 when the lid 14 is attached to the base 12. In some embodiments, when the fastener 37 is tightened to attached the lid 14 to the base 12, the grommet 60 is compressed. In some embodiments, a user may selectively tighten or loosen the fastener 37 to control the amount of force on and compression of the grommet 60. In some embodiments, the compression of the grommet 60 forms a watertight seal with the electrical cables 120 to inhibit the entry of water or moisture in the interior portion 51 of the passthrough 10. In some embodiments, the grommet 60 is elastically deformed. In some embodiments, the grommet 60 is made from rubber. In some embodiments, the grommet 60 is made from styrene-butadiene or styrene-butadiene rubber (SBR). In some embodiments, the grommet 60 is made from nitrile butadiene rubber (NBR). In some embodiments, the grommet 60 is made from EPDM rubber (ethylene propylene diene monomer rubber). In some embodiments, the grommet 60 is made from plastic. In some embodiments, the grommet 60 is made from a polymer. In some embodiments, the grommet 60 is made from silicone. In some embodiments, the grommet 60 is made from polytetrafluoroethylene (PTFE). In some embodiments, the grommet 60 is made from fluorosilicone (FVMQ). In some embodiments, the grommet 60 is made from polyurethane.

In some embodiments, the at least one opening 62 of the grommet 60 includes a plurality of openings 62. In each of the plurality of openings 62 is sized and shaped to receive a corresponding one of the plurality of the electrical cables 120. In some embodiments, the grommet 60 includes a plurality of sections 64. In some embodiments, each of the plurality of sections 64 has a tubular shape. In some embodiments, the plurality of sections 64 are integral. In some embodiments, the grommet 60 has a figure eight shape. In some embodiments, each of the plurality of openings 62 is located in a corresponding one of the plurality of sections 64. In some embodiments, each of the plurality of sections 64 of the grommet 60 is located between a corresponding one of the plurality of first cavities 40 of the base 12 and a corresponding one of the plurality of second cavities 52 of the lid 14. In some embodiments, the plurality of openings 62 is arranged in a linear arrangement. In some embodiments, the grommet 60 has a figure eight shape.

In some embodiments, the passthrough 10 has a thickness of 1 inch to 10 inches. In some embodiments, the passthrough 10 has a thickness of 1 inch to 9 inches. In some embodiments, the passthrough 10 has a thickness of 1 inch to 8 inches. In some embodiments, the passthrough 10 has a thickness of 1 inch to 7 inches. In some embodiments, the passthrough 10 has a thickness of 1 inch to 6 inches. In some embodiments, the passthrough 10 has a thickness of 1 inch to 5 inches. In some embodiments, the passthrough 10 has a thickness of 1 inch to 4 inches. In some embodiments, the passthrough 10 has a thickness of 1 inch to 3 inches. In some embodiments, the passthrough 10 has a thickness of 1 inch to 2 inches. In some embodiments, the passthrough 10 has a thickness of 2 inches to 10 inches. In some embodiments, the passthrough 10 has a thickness of 2 inches to 9 inches. In some embodiments, the passthrough 10 has a thickness of 2 inches to 8 inches. In some embodiments, the passthrough 10 has a thickness of 2 inches to 7 inches. In some embodiments, the passthrough 10 has a thickness of 2 inches to 6 inches. In some embodiments, the passthrough 10 has a thickness of 2 inches to 5 inches. In some embodiments, the passthrough 10 has a thickness of 2 inches to 4 inches. In some embodiments, the passthrough 10 has a thickness of 2 inches to 3 inches.

In some embodiments, the passthrough 10 has a thickness of 3 inches to 10 inches. In some embodiments, the passthrough 10 has a thickness of 3 inches to 9 inches. In some embodiments, the passthrough 10 has a thickness of 3 inches to 8 inches. In some embodiments, the passthrough 10 has a thickness of 3 inches to 7 inches. In some embodiments, the passthrough 10 has a thickness of 3 inches to 6 inches. In some embodiments, the passthrough 10 has a thickness of 3 inches to 5 inches. In some embodiments, the passthrough 10 has a thickness of 3 inches to 4 inches. In some embodiments, the passthrough 10 has a thickness of 4 inches to 10 inches. In some embodiments, the passthrough 10 has a thickness of 4 inches to 9 inches. In some embodiments, the passthrough 10 has a thickness of 4 inches to 8 inches. In some embodiments, the passthrough 10 has a thickness of 4 inches to 7 inches. In some embodiments, the passthrough 10 has a thickness of 4 inches to 6 inches. In some embodiments, the passthrough 10 has a thickness of 4 inches to 5 inches.

In some embodiments, the passthrough 10 has a thickness of 5 inches to 10 inches. In some embodiments, the passthrough 10 has a thickness of 5 inches to 9 inches. In some embodiments, the passthrough 10 has a thickness of 5 inches to 8 inches. In some embodiments, the passthrough 10 has a thickness of 5 inches to 7 inches. In some embodiments, the passthrough 10 has a thickness of 5 inches to 6 inches. In some embodiments, the passthrough 10 has a thickness of 6 inches to 10 inches. In some embodiments, the passthrough 10 has a thickness of 6 inches to 9 inches. In some embodiments, the passthrough 10 has a thickness of 6 inches to 8 inches. In some embodiments, the passthrough 10 has a thickness of 6 inches to 7 inches. In some embodiments, the passthrough 10 has a thickness of 7 inches to 10 inches. In some embodiments, the passthrough 10 has a thickness of 7 inches to 9 inches. In some embodiments, the passthrough 10 has a thickness of 7 inches to 8 inches. In some embodiments, the passthrough 10 has a thickness of 8 inches to 10 inches. In some embodiments, the passthrough 10 has a thickness of 8 inches to 9 inches. In some embodiments, the passthrough 10 has a thickness of 9 inches to 10 inches.

In some embodiments, the passthrough 10 has a thickness of 1 inch. In some embodiments, the passthrough 10 has a thickness of 2 inches. In some embodiments, the passthrough 10 has a thickness of 3 inches. In some embodiments, the passthrough 10 has a thickness of 4 inches. In some embodiments, the passthrough 10 has a thickness of 5 inches. In some embodiments, the passthrough 10 has a thickness of 6 inches. In some embodiments, the passthrough 10 has a thickness of 7 inches. In some embodiments, the passthrough 10 has a thickness of 8 inches. In some embodiments, the passthrough 10 has a thickness of 9 inches. In some embodiments, the passthrough 10 has a thickness of 10 inches.

Figure 3A:
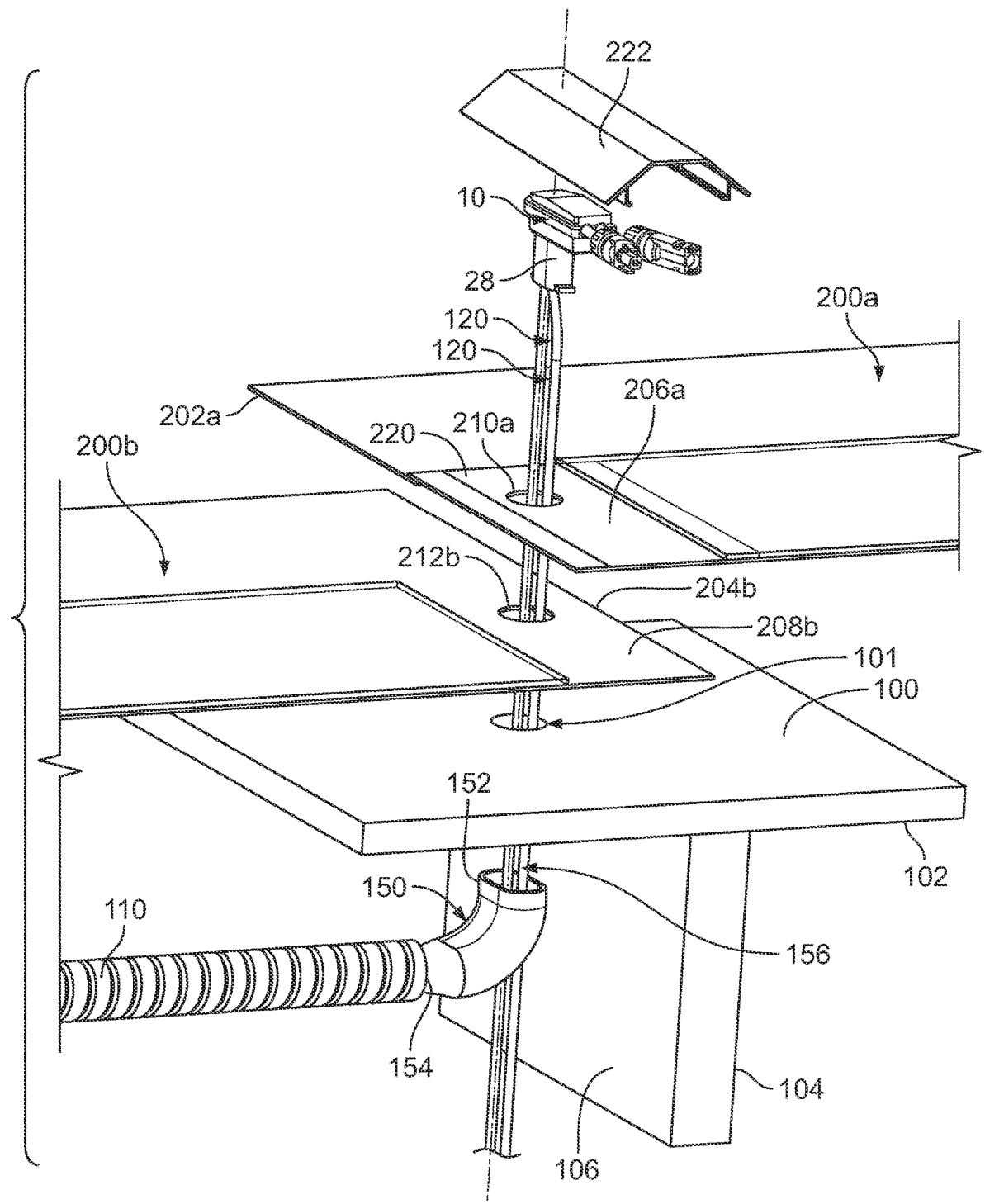
FIGS. 3A and 3B illustrate some embodiments of an electrical cable passthrough, a photovoltaic module, and a roofing shingle installed on a roof deck.
Figure 3B:
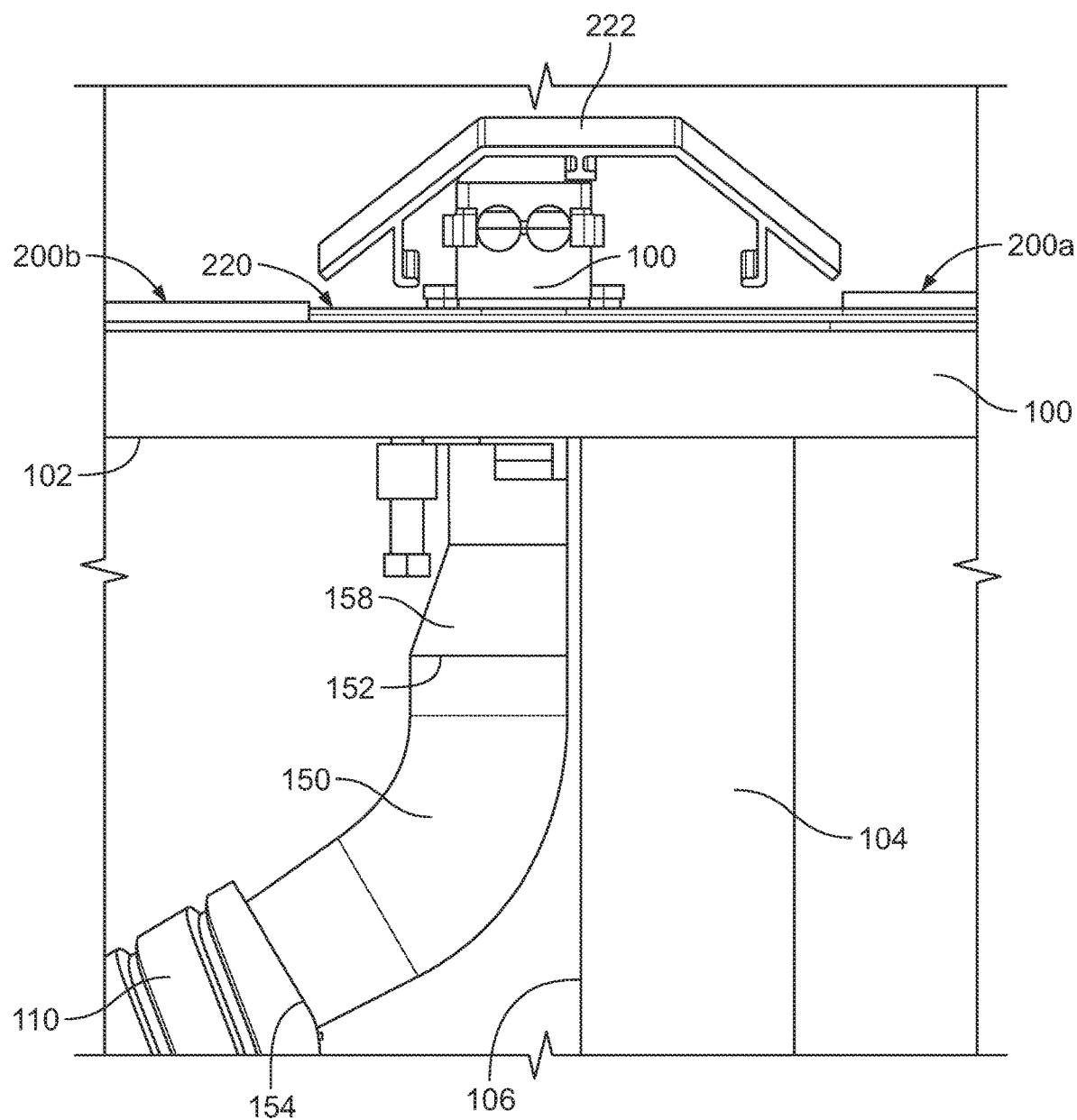
Figure 3C:
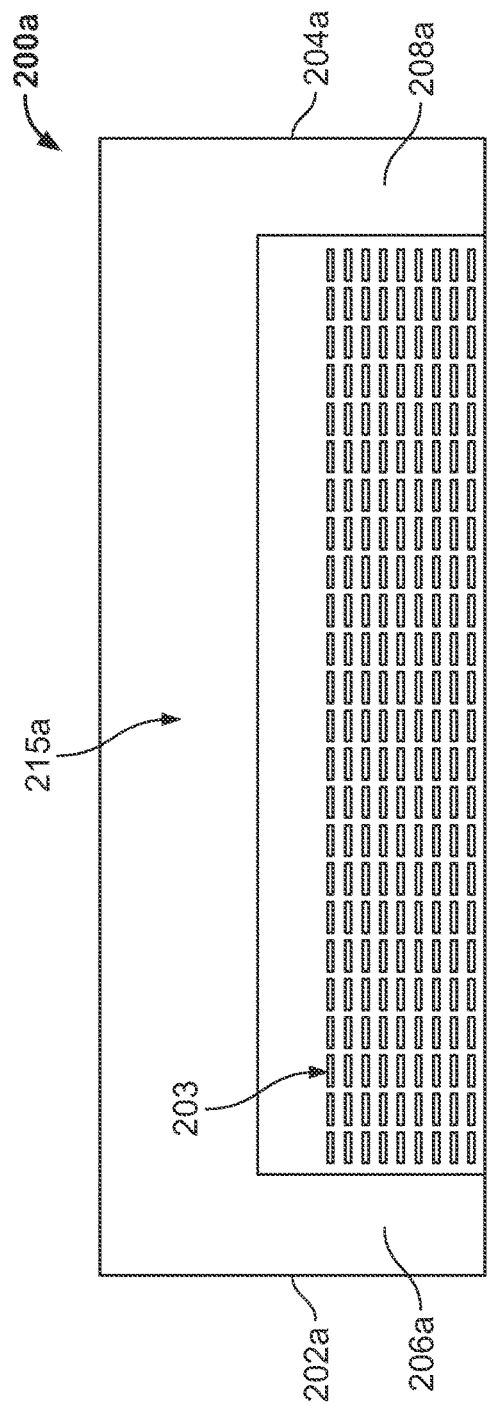
FIGS. 3C and 3D illustrate some embodiments of a roofing shingle and a photovoltaic module shown in FIG. 3A and FIG. 4.
Figure 3D:
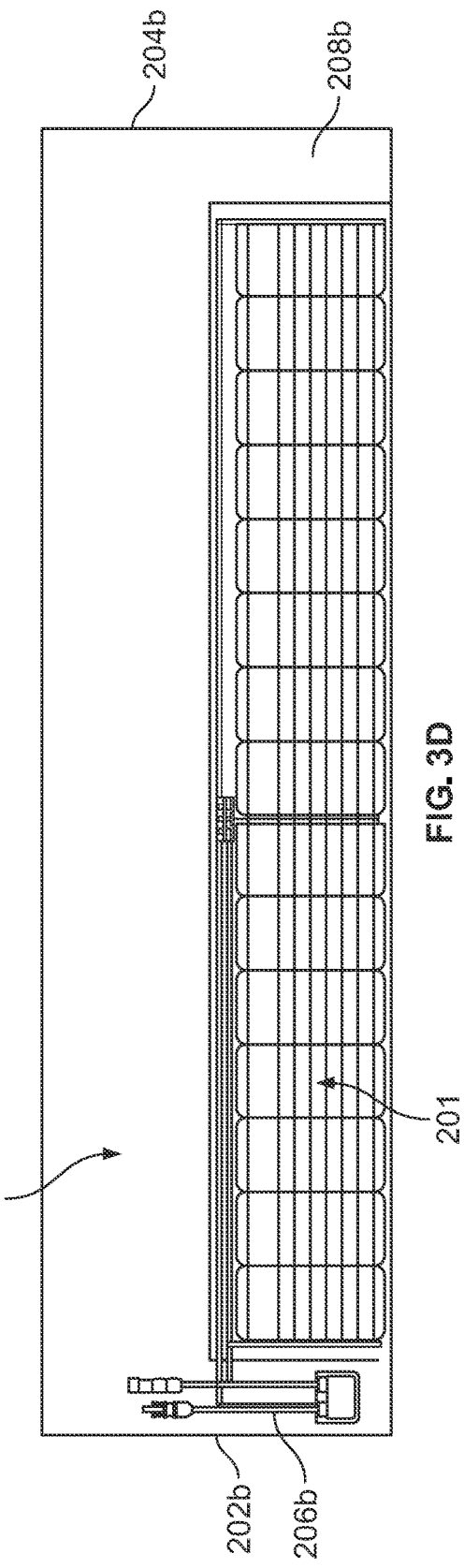

Referring to FIGS. 3A and 3B, in some embodiments, the passthrough 10 is installed on the roof deck 100. In some embodiments, the roof deck 100 includes an aperture 101. Referring to FIGS. 3A through 3D, in some embodiments, at least one roofing shingle 200a (also referred to as a roofing module) is installed on the roof deck 100. In some embodiments, the roofing shingle 200a does not include a solar cell, a photovoltaic cell, or any electrical device that converts the energy of light into electricity. In some embodiments, the roofing shingle 200a does not include any electrically active components. In some embodiments, the roofing shingle 200a is a cuttable roofing shingle. In some embodiments, the roofing shingle 200a is a nailable roofing shingle. In some embodiments, the roofing shingle 200a is attached to the roof deck 100 by at least one fastener or a plurality of fasteners. In some embodiments, the fasteners include nails, rivets, screws or staples, or a combination thereof. In some embodiments, the roofing shingle 200a is textured. In some embodiments, the roofing shingle 200a includes a printed pattern 203. In some embodiments, the printed pattern 203 includes a depiction of solar cells. In some embodiments, the at least one roofing shingle 200a includes a plurality of roofing shingles 200a. In some embodiments, each of the roofing shingles 200a includes a first end 202a and a second end 204a opposite the first end 202a. In some embodiments, each of the roofing shingles 200a includes a first side lap 206a at the first end 202a. In some embodiments, each of the roofing shingles 200a includes a second side lap 208a at the second end 204a. In some embodiments, the first side lap 206a of the roofing shingle 200a includes an aperture 210a extending from an upper surface to a lower surface thereof. In some embodiments, the roofing shingle 200a includes a head lap portion 215a. In some embodiments, the head lap portion 215a is configured to receive one or more of the fasteners for installing the roofing shingle 200a to the roof deck. In some embodiments, at least a portion of a first roofing shingle 200a is configured to overlay the head lap portion 215a of a second roofing shingle 200a.

In some embodiments, the roofing shingle 200a includes a structure, composition and/or function of similar to those of more or one of the embodiments of the roofing modules disclosed in in U.S. application Ser. No. 17/831,307, filed Jun. 2, 2022, titled "Roofing Module System," and published under U.S. Patent Application Publication No. 2022-0393637 on Dec. 8, 2022, and owned by GAF Energy LLC; and/or U.S. application Ser. No. 18/169,718, filed Feb. 15, 2023, titled "Roofing Module System," and published under U.S. Patent Application Publication No. 2023-0203815 on Jun. 29, 2023, and owned by GAF Energy LLC, the disclosure and contents of each of which are incorporated by reference herein in their entirety.

In some embodiments, at least one photovoltaic module 200b is installed on the roof deck 100. In some embodiments, the photovoltaic module 200b includes a plurality of solar cells 201. In some embodiments, the at least one photovoltaic module 200b includes a plurality of photovoltaic modules 200b. In some embodiments, each of the photovoltaic modules 200b includes a first end 202b and a second end 204b opposite the first end 202b. In some embodiments, each of the photovoltaic modules 200b includes a first side lap 206b at the first end 202b. In some embodiments, each of the photovoltaic modules 200b includes a second side lap 208b at the second end 204b. In some embodiments, the second side lap 208b of the photovoltaic module 200b includes an aperture 212b extending from an upper surface to a lower surface thereof.

In some embodiments, the photovoltaic module 200b includes a head lap portion 215b. In some embodiments, the head lap portion 215b is configured to receive one or more fasteners. In some embodiments, at least a portion of a first photovoltaic module 200b is configured to overlay the head lap portion 215b of a second photovoltaic module 200b.

In some embodiments, at least a portion of a first photovoltaic module 200b is configured to overlay the head lap portion 215a of a first roofing shingle 200a. In some embodiments, at least a portion of a first roofing shingle 200a is configured to overlay the head lap portion 215b of a first photovoltaic module 200b.

In some embodiments, each of the photovoltaic modules 200b includes a structure, composition, features, components, and/or function similar to those of one or more embodiments of the photovoltaic modules disclosed in PCT International Patent Publication No. WO 2022/051593, Application No. PCT/US2021/049017, published Mar. 10, 2022, entitled Building Integrated Photovoltaic System, and owned by GAF Energy LLC; and U.S. Pat. No. 11,251,744 to Bunea et al., issued Feb. 15, 2022, entitled "Photovoltaic Shingles and Methods of Installing Same," and owned by GAF Energy, LLC, the disclosure and contents of each of which are incorporated by reference herein in their entirety.

In some embodiments, the first side lap 206a of the roofing shingle 200a overlays the second side lap 208b of the photovoltaic module 200b. In some embodiments, the aperture 101 of the roof deck 100, the aperture 210a of the roofing shingle 200a, and the aperture 212b of the photovoltaic module 200b are aligned with one another. In some embodiments, the aperture 101 of the roof deck 100, the aperture 210a of the roofing shingle 200a, and the aperture 212b of the photovoltaic module 200b are substantially aligned with one another.

In some embodiments, the passthrough 10 is installed on the first side lap 206a of the roofing shingle 200a. In some embodiments, the base 12 of the passthrough 10 is substantially parallel to the roof deck 100. In some embodiments, a lower surface 15 of the base 12 is substantially parallel to the roof deck 100. In some embodiments, the aperture 26 of the base 12 of the passthrough 10 is configured to align with the aperture 101 of the roof deck 100, the aperture 210a of the roofing shingle 200a, and the aperture 212b of the photovoltaic module 200b.

Referring to FIGS. 3A and 3B, in some embodiments, the first side lap 206a of the roofing shingle 200a and the second side lap 208b of the photovoltaic module 200b form a wireway 220. In some embodiments, the passthrough 10 is located within the wireway 220 when the passthrough 10 is installed on the roof deck 100. In some embodiments, a cover 222 is attached to the wireway 220. In some embodiments, the cover 222 is removably attached to the wireway 220. In some embodiments, the cover 222 covers the passthrough 10. In some embodiments, the cover 222 inhibits water or moisture from entering the wireway 220. In some embodiments, the cover 222 includes multiple cover portions or a plurality of the covers 222 connected to one another. In some embodiments, each of the wireway 220 and the cover 222 has a structure, composition, components, features, and/or function similar to those of one or more embodiments of the wireways and covers disclosed in PCT International Patent Publication No. WO 2022/051593, Application No. PCT/US2021/049017, published Mar. 10, 2022, entitled Building Integrated Photovoltaic System, owned by GAF Energy LLC; and/or U.S. Pat. No. 11,251,744 to Bunea et al., issued Feb. 15, 2022, entitled "Photovoltaic Shingles and Methods of Installing Same," and owned by GAF Energy, LLC, the disclosure and contents of each of which are incorporated by reference herein in their entirety.

In some embodiments, an underlayment layer overlays the roof deck 100. In some embodiments, the electrical cable passthrough 10 is installed on the underlayment layer. In some embodiments, a sealant is applied intermediate the underlayment layer and the base 12 of the electrical cable passthrough 10. In some embodiments, the sealant includes butyl, silicone, rubber, epoxy, latex, neoprene, or polyurethane foam.

In some embodiments, the interior portion 51 is sized and shaped to receive the electrical cables 120. In some embodiments, the electrical cables 120 are connected to corresponding ones of the electrical connectors 122. In some embodiments, the electrical cables 120 extend though the passthrough 10 and the conduit 110. In some embodiments, the aperture 26 of the base 12 of the passthrough 10 is sized and shaped to receive the electrical cables 120. In some embodiments, the first ends 121 of the electrical cables 120 extend outwardly from the first end 11 of base 12 and the first end 42 of the lid 14 of the passthrough 10. In some embodiments, each of the electrical cables 120 is a THHN stranded wire. In some embodiments, each of the electrical cables 120 is a XHHW stranded wire.

Still referring to FIGS. 3A and 3B, in some embodiments, a receiver 150 includes a first end 152, a second end 154 opposite the first end 152, and an aperture 156 extending from the first end 152 to the second end 154. In some embodiments, the receiver 150 has an symmetric shape. In some embodiments, the receiver 150 is tubular in shape. In some embodiments, the receiver 150 has a rectangular-tubular shape. In some embodiments, the receiver 150 has an asymmetric shape. In some embodiments, the receiver 150 has a curvilinear shape. In some embodiments, the receiver 150 has an elbow-shape.

In some embodiments, the receiver 150 is installed underneath an inner surface 102 of the roof deck 100. In some embodiments, the first end 152 of the receiver 150 is attached to the tubular portion 28 of the base 12 of the passthrough 10. In some embodiments, the first end 152 of the receiver 150 is attached a fitting 158 which, in turn, is attached to the tubular portion 28 of the base 12 of the passthrough 10. In some embodiments, the second end 154 of the receiver 150 is attached to an end of the conduit 110. In some embodiments, the aperture 156 of the receiver 150 is sized and shaped to receive the at least one electrical cable 120 therethrough. In some embodiments, a rafter 104 is located underneath the inner surface 102 roof deck 100. In some embodiments, the rafter 104 supports the roof deck 100. In some embodiments, the rafter 104 is perpendicular to the roof deck 100. In some embodiments, the rafter 104 is substantially perpendicular to the roof deck 100. In some embodiments, the receiver 150 is installed proximate to a rafter 104. In some embodiments, the receiver 150 is installed proximate to a first surface 106 of the rafter 104. In some embodiments, the receiver 150 is installed adjacent to a first surface 106 of the rafter 104. In some embodiments, the receiver 150 is configured to carry the at least one electrical cable 120 away from the rafter 104. In some embodiments, the receiver 150 is configured to clamp the passthrough 10 to the roof deck 100.

In some embodiments, the receiver 150 extends 30 degrees to 90 degrees relative to the inner surface 102 of the roof deck 100. In another embodiment, the receiver 150 extends 30 degrees to 80 degrees relative to the inner surface 102 of the roof deck 100. In another embodiment, the receiver 150 extends 30 degrees to 70 degrees relative to the inner surface 102 of the roof deck 100. In another embodiment, the receiver 150 extends 30 degrees to 60 degrees relative to the inner surface 102 of the roof deck 100. In another embodiment, the receiver 150 extends 30 degrees to 50 degrees relative to the inner surface 102 of the roof deck 100. In another embodiment, the receiver 150 extends 30 degrees to 40 degrees relative to the inner surface 102 of the roof deck 100.

In some embodiments, the receiver 150 extends 40 degrees to 90 degrees relative to the inner surface 102 of the roof deck 100. In another embodiment, the receiver 150 extends 40 degrees to 80 degrees relative to the inner surface 102 of the roof deck 100. In another embodiment, the receiver 150 extends 40 degrees to 70 degrees relative to the inner surface 102 of the roof deck 100. In another embodiment, the receiver 150 extends 40 degrees to 60 degrees relative to the inner surface 102 of the roof deck 100. In another embodiment, the receiver 150 extends 40 degrees to 50 degrees relative to the inner surface 102 of the roof deck 100. In some embodiments, the receiver 150 extends 50 degrees to 90 degrees relative to the inner surface 102 of the roof deck 100. In another embodiment, the receiver 150 extends 50 degrees to 80 degrees relative to the inner surface 102 of the roof deck 100. In another embodiment, the receiver 150 extends 50 degrees to 70 degrees relative to the inner surface 102 of the roof deck 100. In another embodiment, the receiver 150 extends 50 degrees to 60 degrees relative to the inner surface 102 of the roof deck 100.

In some embodiments, the receiver 150 extends 60 degrees to 90 degrees relative to the inner surface 102 of the roof deck 100. In another embodiment, the receiver 150 extends 60 degrees to 80 degrees relative to the inner surface 102 of the roof deck 100. In another embodiment, the receiver 150 extends 60 degrees to 70 degrees relative to the inner surface 102 of the roof deck 100. In some embodiments, the receiver 150 extends 70 degrees to 90 degrees relative to the inner surface 102 of the roof deck 100. In another embodiment, the receiver 150 extends 70 degrees to 80 degrees relative to the inner surface 102 of the roof deck 100. In some embodiments, the receiver 150 extends 80 degrees to 90 degrees relative to the inner surface 102 of the roof deck 100.

In some embodiments, a second one of the roofing shingle 200*a* may be located in place of the photovoltaic module 200*b*. In some embodiments, the roofing shingle 200*a* may overlap at least a portion of another shingle 200*a* that is vertically adjacent and below same. In some embodiments, at least a portion of the roofing shingle 200*a* may be overlapped by yet another roofing shingle 200*a* that is vertically adjacent and above same. In some embodiments, the roofing shingle 200*a* may overlap at least a portion of another photovoltaic module 200*b* that is vertically adjacent and below same. In some embodiments, at least a portion of the roofing shingle 200*a* may be overlapped by another photovoltaic module 200*b* that is vertically adjacent and above same.

Figure 4:
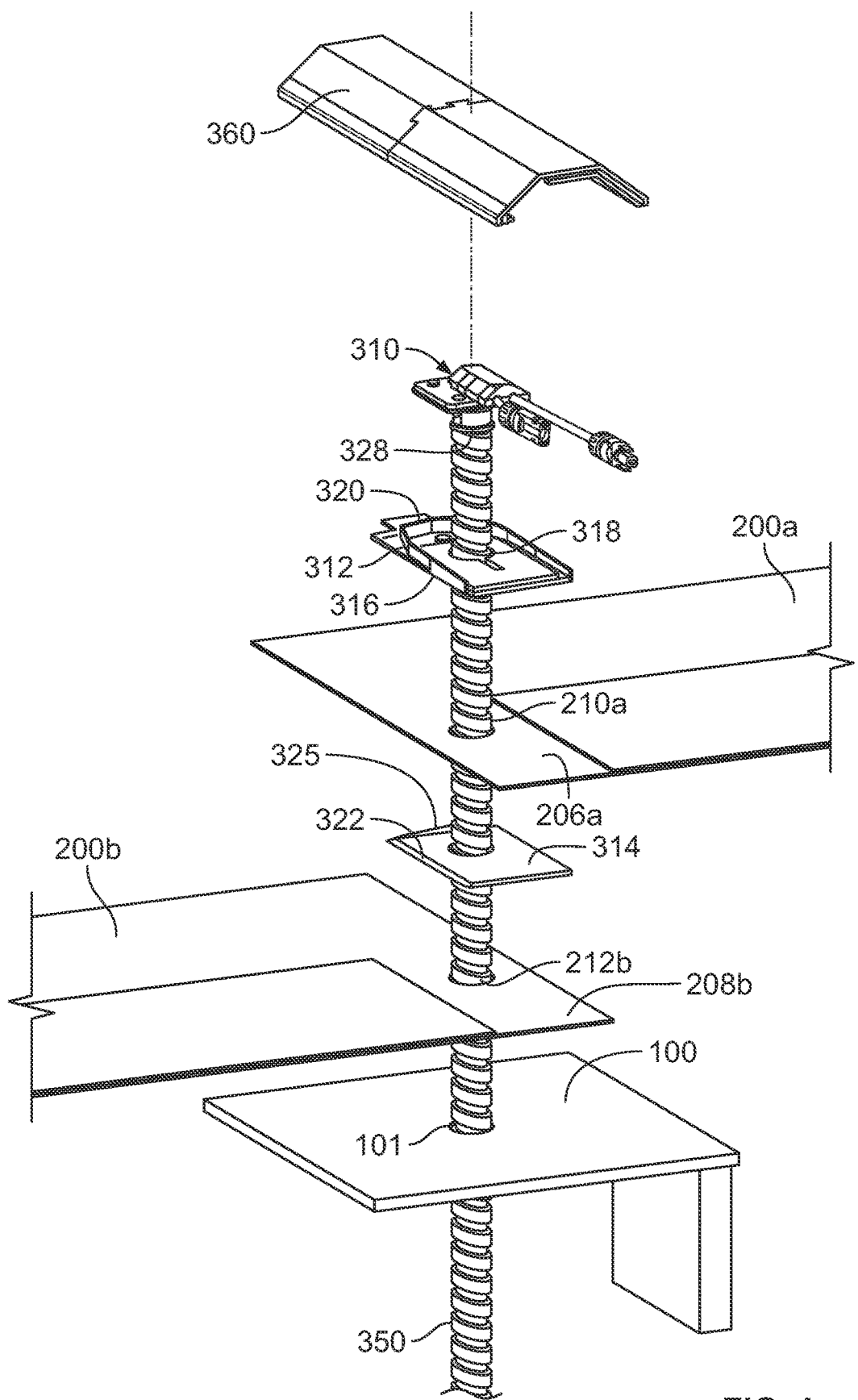
FIGS. 4 through 4D illustrate some embodiments of an electrical cable passthrough and components thereof, a photovoltaic module, and a roofing shingle installed on a roof deck.
Figure 4A:
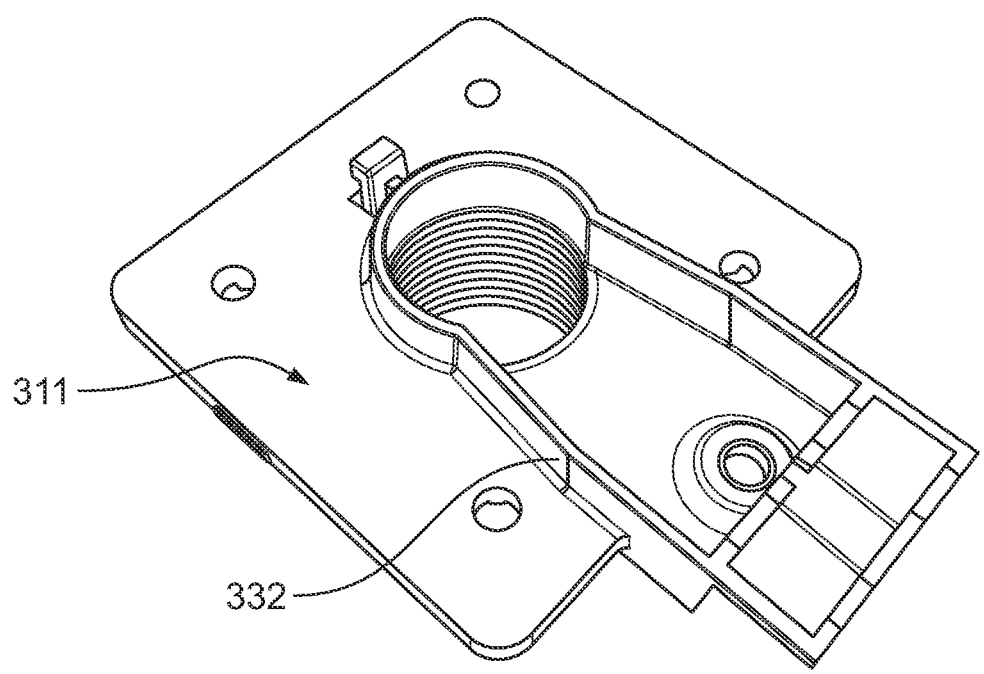
Figure 4B:
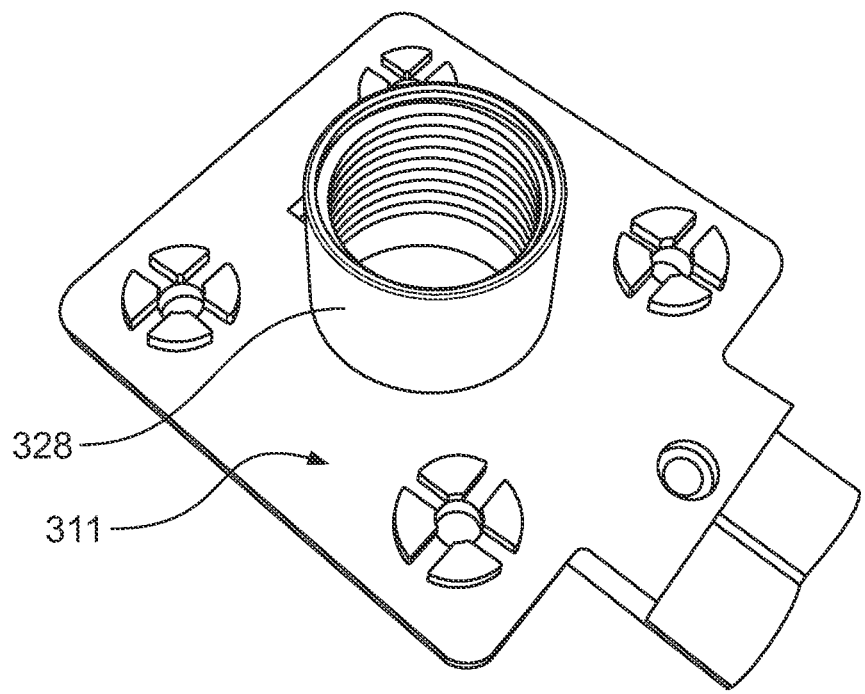
Figure 4C:
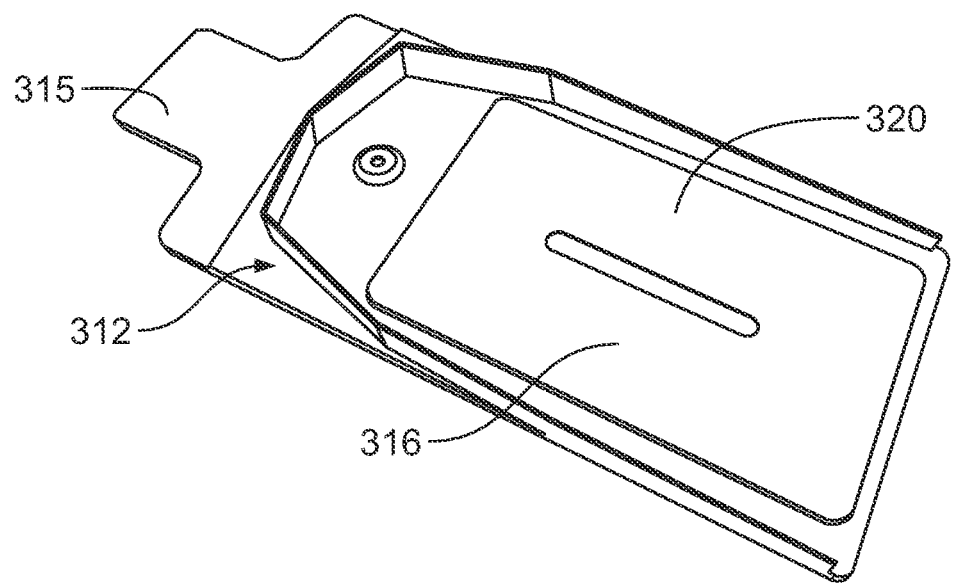
Figure 4D:
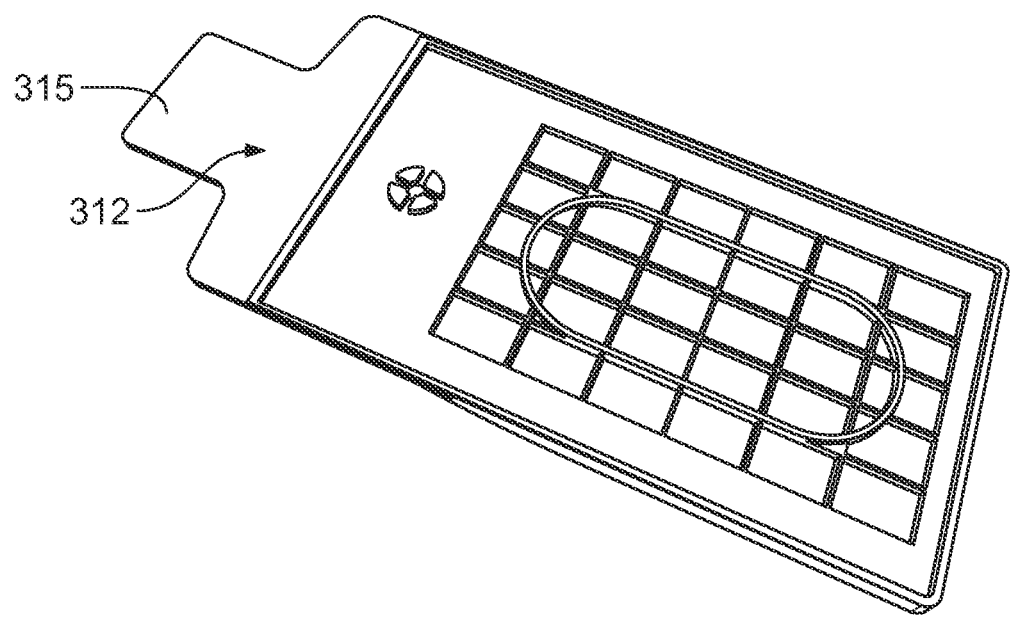

FIGS. 4 through 4D show some embodiments of a passthrough 310 and components thereof installed on the roof deck 100. In some embodiments, the passthrough 310 and the overall roofing system include a structure, function, components and features similar to those of the passthrough 10 and the corresponding system, with some differences. Referring to FIGS. 4A and 4B, in some embodiments, the passthrough 310 includes a base plate 311, a sidewall 332 and a tubular member 328.

Referring to FIG. 4, in some embodiments, the roofing system includes a first flashing member 312. In some embodiments, the roofing system includes a second flashing member 314. Referring to FIGS. 4, 4C and 4D, in some embodiments, the first flashing member 312 includes a base 316, an aperture 318 through the base 316, and a sidewall 320 around at least a portion of a perimeter of the base 316. In some embodiments, the aperture 318 is pre-formed in the base 318 during manufacturing thereof. In some embodiments, the base 316 may have one or more templates for a user to cut out material therefrom the form the aperture 318 for custom installation or alignment. In some embodiments, the first flashing member 312 includes a tab 315 extend from one end thereof.

In some embodiment, the first flashing member 312 overlays and is above the first side lap 206*a* of the roofing shingle 200*a*. In some embodiments, a separate seal or sealing member is between the underside of the first flashing member 312 and the first side lap 206*a* of the roofing shingle 200*a*. In some embodiments, the seal is similar to the seal 111. In some embodiments, the aperture 318 is aligned or substantially aligned with the aperture 210*a* of the roofing shingle 200*a*. In some embodiments, the passthrough 310 overlays and is above the first flashing member 312. In some embodiments, the tubular member 328 of the passthrough 310 is installed within the aperture 318 of the first flashing member 312. In some embodiments, the first flashing member 312 is configured to watershed water. In some embodiments, the sidewall 320 channels a flow of any water down the slope of the roof deck 100. In some embodiments, the sidewall 320 diverts water away from the seal member. In some embodiments, another roofing shingle overlays the tab 315 of the first flashing member 312 to facilitate securement of the first flashing member 312 on the roof deck.

In some embodiments, the second flashing member 314 is located between the roofing shingle 200*a* and the photovoltaic module 200*b*. In some embodiments, the second flashing member 314 is located between the lower surface of the first side lap 206*a* of the roofing shingle 200*a* and the upper surface of the photovoltaic module 200*b*. In some embodiments, the second flashing member 314 is located between the lower surface of the first side lap 206*a* of the first roofing shingle 200*a* and the upper surface of the second side lap 208*b* of the photovoltaic module 200*b*. In some embodiments, the second flashing member 314 includes an aperture 322. In some embodiments, the aperture 322 is aligned or substantially aligned with the aperture 318 of the first flashing member 312, the aperture 210*a* of the roofing shingle 200*a*, the aperture 212*b* of the photovoltaic module 200*b*, and the aperture 101 of the roof deck 100. In some embodiments, the second flashing member 314 includes an upper edge 325. In some embodiments, the upper edge 325 is angled relative to side portions thereof. In some embodiments, the second flashing member 314 is configured to seal to prevent water and/or watershed water. In some embodiments, a cover 360 covers the passthrough 310 and the first flashing member 312 to watershed water.

In some embodiments, the tubular member 328 of the passthrough 310 is installed within and through the aperture 322 of the second flashing member 314, the aperture 318 of the first flashing member 312, the aperture 210*a* of the roofing shingle 200*a*, the aperture 212*b* of the photovoltaic module 200*b*, and the aperture 101 of the roof deck 100. In some embodiments, a conduit 350 extends through the foregoing apertures and connects to the tubular member 328 of the passthrough 310 and houses and shrouds the electrical wires. In some embodiments, the upper edge 325 of the second flashing member 314 is configured to prevent any water that enters between the second side lap 208*b* of the photovoltaic module 200*b* and the underside of the second flashing member 314 from travelling laterally (left to right) and diverts and drains the water from right to left.

Figure 5:
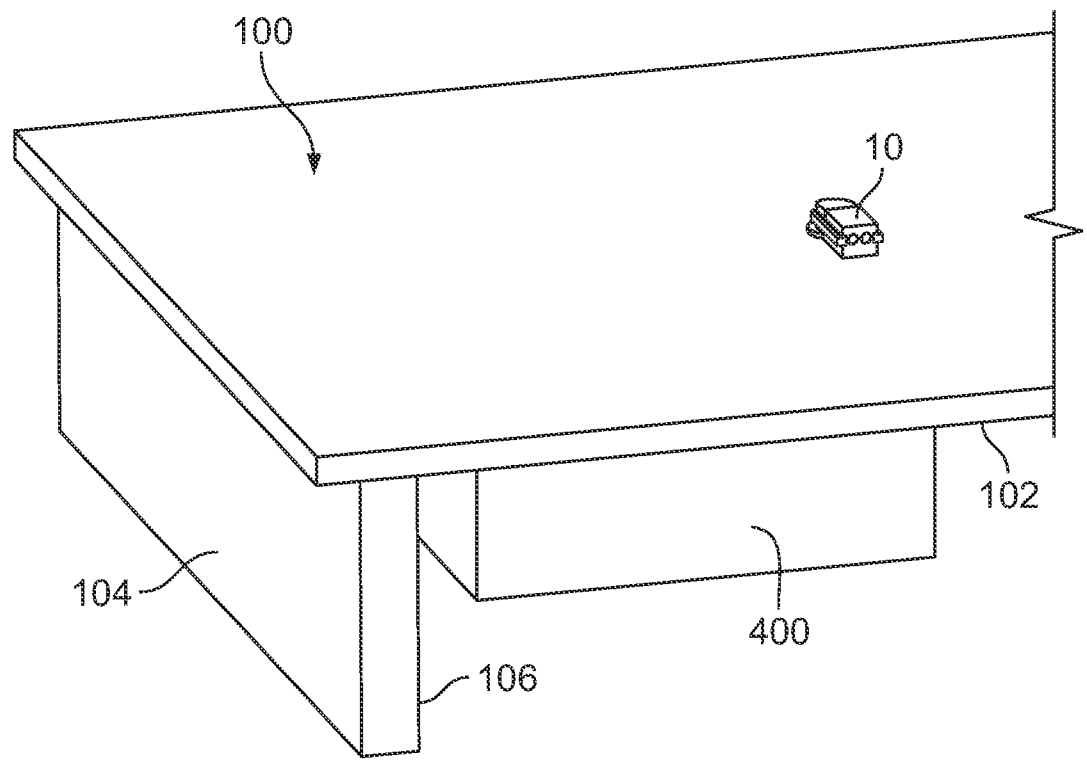
FIGS. 5 and 6 illustrate some embodiments of an electrical cable passthrough installed on a roof deck.
Figure 6:
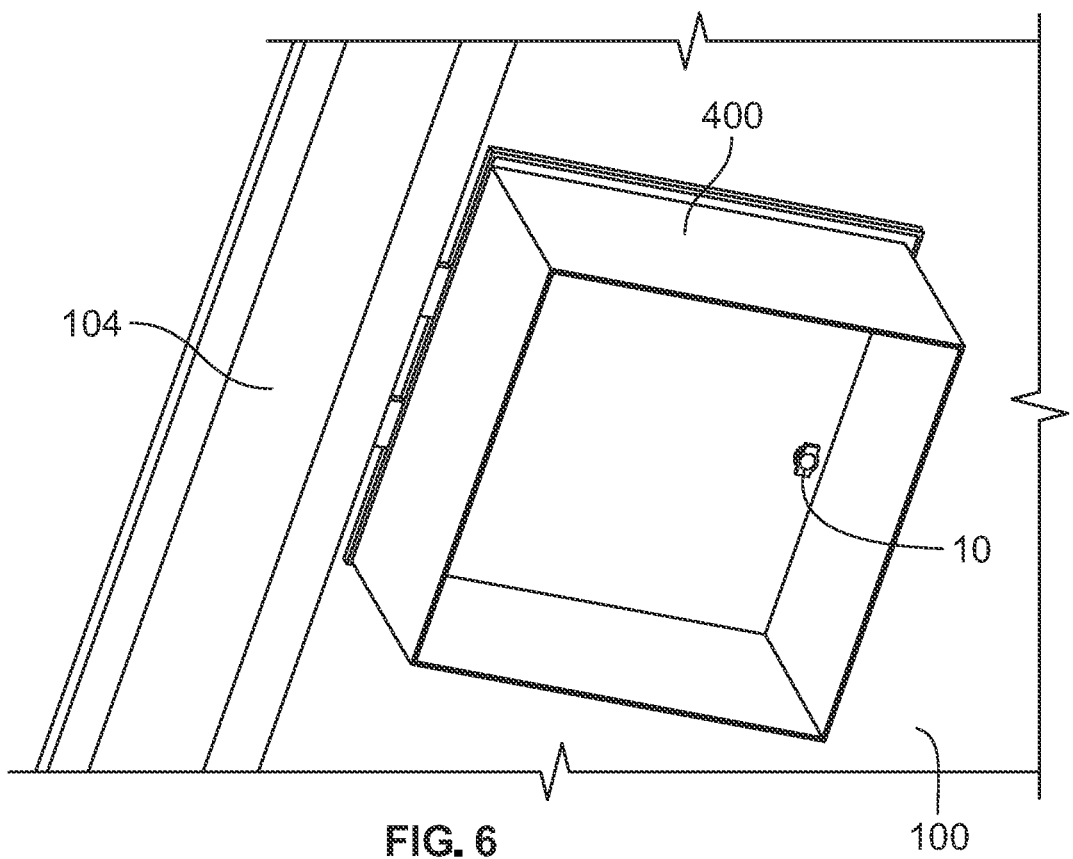

Referring to FIGS. 5 and 6, in some embodiments, an electrical box 400 is installed underneath the roof deck 100 and within the structure. In some embodiment, the electrical box 400 is installed on the inner surface 102 of the roof deck 100. In some embodiment, the electrical box 400 is installed proximate to the first surface 106 of the rafter 104. In some embodiments, the electrical box 400 directly receives the tubular portion 28 of the passthrough 10. In some embodiments, the conduit 110 is not utilized. In some embodiments, the electrical box 400 is a combiner box.

In some embodiments, the passthrough 10 may include a structure, composition, function, and/or one or more features similar to those of more or one of the embodiments of the electrical cable passthrough devices disclosed in U.S. Pat. No. 11,177,639 to Nguyen et al., issued Nov. 16, 2021, entitled Electrical Cable Passthrough for Photovoltaic Systems, owned by GAF Energy LLC; and/or U.S. Pat. No. 11,658,470, to Nguyen et al. issued May 23, 2023, entitled Electrical Cable Passthrough for Photovoltaic Systems, owned by GAF Energy LLC, the disclosure and contents of each of which are incorporated by reference herein in their entirety.

In some embodiments, the passthrough 10 is configured for use with electrical systems of building-integrated photovoltaic (BIPV) systems. In another embodiment, the passthrough 10 is configured for use with retrofit photovoltaic systems for roofing. In other embodiments, the passthrough 10 is configured for use with other electrical systems.

The embodiments described herein are merely exemplary and that a person skilled in the art may make many variations and modifications without departing from the spirit and scope of the invention. All such variations and modifications are intended to be included within the scope of the invention.

What is claimed is:

1. A system, comprising:
   a roof deck;
   a passthrough installed on the roof deck, wherein the passthrough includes
   a base having a first end and a second end opposite the first end,
a first surface extending from the first end to the second end,
a second surface opposite the first surface,
an aperture extending from the first surface to the second surface, and
a plurality of first cavities,
a lid attached to the base,
wherein the lid includes
a first end substantially aligned with the first end of the base, and
a plurality of second cavities,
a sidewall between the base and the lid,
wherein the sidewall includes
a first end, wherein the first end of the sidewall is proximate to the first end of the base, and
a plurality of apertures,
wherein the plurality of apertures of the sidewall is located at the first end of the sidewall,
wherein each of the plurality of first cavities and each of a corresponding one of the plurality of second cavities are sized and shaped to form a corresponding one of the plurality of apertures,
wherein the first surface is juxtaposed with the roof deck, and
wherein the aperture of the base of the passthrough is configured to align with an aperture formed within the roof deck;
a plurality of cables,
wherein each of the plurality of cables includes a first end and a second end opposite the first end of the cable,
wherein each of the plurality of apertures of the sidewall is sized and shaped to receive a corresponding one of the plurality of cables; and
a grommet installed on the at least one plurality of cables proximate to the first end of each of the plurality of cables,
wherein the grommet is located between the plurality of first cavities and the plurality of second cavities,
wherein the grommet includes
a plurality of openings sized and shaped to receive a corresponding one of the plurality of cables, and
a plurality of sections, wherein each of the plurality of openings is located in a corresponding one of the plurality of sections,
wherein each of the plurality of sections of the grommet is located between a corresponding one of the plurality of first cavities and a corresponding one of the plurality of second cavities,
wherein the lid and the base are configured to compress the grommet between the plurality of first cavities and the plurality of second cavities and around the plurality of cables when the lid is attached to the base,
wherein the aperture of the base of the passthrough is sized and shaped to receive the plurality of cables, and
wherein the first end of each of the plurality of cables extends outwardly from the first end of base and the first end of the lid of the passthrough.

2. The system of claim 1, wherein the lid is removably attached to the base.

3. The system of claim 1, further comprising a photovoltaic module installed on the roof deck, wherein the passthrough is installed proximate to the photovoltaic module.

4. The system of claim 1, wherein each of the plurality of cables includes an electrical connector, wherein each of the plurality of apertures of the sidewall is sized and shaped to receive a corresponding one of the electrical connector of the corresponding one of the plurality of cables.

5. The system of claim 1, wherein the base of the passthrough includes a tubular member extending from the first surface, wherein the tubular member includes the aperture of the base, and wherein the aperture of the roof deck is sized and shaped to receive the tubular member.

6. The system of claim 5, further comprising a receiver attached to the tubular member.

7. The system of claim 5, further comprising an electrical box installed underneath the roof deck, and wherein the electrical box directly receives the tubular member.

8. A cable passthrough, comprising:
a base having
a first end and a second end opposite the first end,
a first surface extending from the first end to the second end,
a second surface opposite the first surface,
a plurality of first cavities, and
an aperture extending from the first surface to the second surface;
a lid attached to the base,
wherein the lid includes
a first end substantially aligned with the first end of the base, and
a plurality of second cavities; and
a sidewall between the base and the lid,
wherein the sidewall includes
a first end, wherein the first end of the sidewall is proximate to the first end of the base, and
a plurality of apertures,
wherein the plurality of apertures of the sidewall is located at the first end of the sidewall,
wherein each of the plurality of first cavities and a corresponding one of each of the plurality of second cavities are sized and shaped to form a corresponding one of the plurality of apertures,
wherein the cable passthrough is configured to be installed on a roof deck such that the first surface is juxtaposed with the roof deck, and
wherein the aperture of the base is configured to align with an aperture formed within the roof deck,
wherein the cable passthrough is configured to receive a plurality of cables,
wherein the aperture of the base is sized and shaped to receive the plurality of cables,
wherein the plurality of cables is capable of extending outwardly from the first end of the base and the first end of the lid of the cable passthrough, and
wherein the lid and the base are configured to compress a grommet installed between the plurality of first cavities and the plurality of second cavities and around the plurality of cables when the lid is attached to the base,
wherein the grommet includes a plurality of openings sized and shaped to receive a corresponding one of the plurality of cables, and a plurality of sections, wherein each of the plurality of openings is located in a corresponding one of the plurality of sections, wherein each of the plurality of sections is configured to be located between a corresponding one of the plurality of first cavities and a corresponding one of the plurality of second cavities.

9. A system, comprising:
a passthrough installed on a roof deck, wherein the passthrough includes
  a base having a plurality of first cavities,
  a lid attached to the base, wherein the lid includes a plurality of second cavities, and
  a sidewall between the base and the lid, wherein the sidewall includes a plurality of apertures, wherein each of the plurality of first cavities and a corresponding one of each of the plurality of second cavities are sized and shaped to form a corresponding one of the plurality of apertures;
a plurality of cables,
  wherein each of the plurality of apertures of the sidewall receives a corresponding one of the plurality of cables; and
a grommet installed on the plurality of cables, wherein the grommet is located between the plurality of first cavities and the plurality of second cavities, wherein the grommet includes
  a plurality of sections, and
  a plurality of openings, each of which is located in a corresponding one of the plurality of sections,
    wherein each of the plurality of openings receives a corresponding one of the plurality of cables,
    wherein each of the plurality of sections of the grommet is located between a corresponding one of the plurality of first cavities and a corresponding one of the plurality of second cavities, and
  wherein the lid and the base are configured to compress the grommet between the plurality of first cavities and the plurality of second cavities and around the plurality of cables when the lid is attached to the base.

10. The system of claim 9, wherein the lid is removably attached to the base.

11. The system of claim 9, further comprising a photovoltaic module installed on the roof deck, wherein the passthrough is installed proximate to the photovoltaic module.

12. The system of claim 9, wherein each of the plurality of cables includes an electrical connector, wherein each of the plurality of apertures of the sidewall is sized and shaped to receive a corresponding one of the electrical connector of the plurality of cables.

13. The system of claim 9, wherein the base of the passthrough includes a tubular member, and wherein an aperture in the roof deck is sized and shaped to receive the tubular member.

14. The system of claim 13, further comprising a receiver attached to the tubular member.

15. The system of claim 13, further comprising an electrical box installed underneath the roof deck, and wherein the electrical box directly receives the tubular member.

* * * * *